(12) United States Patent
Narita et al.

(10) Patent No.: US 7,973,440 B2
(45) Date of Patent: Jul. 5, 2011

(54) OIL-REPELLENT FILM FORMING METHOD, MOTOR MANUFACTURING METHOD AND MOTOR

(75) Inventors: Takayuki Narita, Kyoto (JP); Yuki Konishi, Kyoto (JP)

(73) Assignee: Nidec Corporation, Kyoto (JP)

( * ) Notice: Subject to any disclaimer, the term of this patent is extended or adjusted under 35 U.S.C. 154(b) by 190 days.

(21) Appl. No.: 12/336,597

(22) Filed: Dec. 17, 2008

(65) Prior Publication Data

US 2009/0152969 A1 Jun. 18, 2009

(30) Foreign Application Priority Data

Dec. 18, 2007 (JP) .................. 2007-325735

(51) Int. Cl.
*H02K 5/16* (2006.01)
(52) U.S. Cl. .......................... 310/90; 29/596
(58) Field of Classification Search ............ 310/90; 29/596
See application file for complete search history.

(56) References Cited

U.S. PATENT DOCUMENTS

| 5,210,928 | A * | 5/1993 | Seshita et al. ............ 29/596 |
| 7,088,023 | B1 | 8/2006 | Gomyo et al. |
| 7,667,360 | B2 * | 2/2010 | Fukushima ............ 310/90 |
| 2004/0187955 | A1 | 9/2004 | Misu et al. |
| 2005/0274018 | A1 | 12/2005 | Gomyo et al. |
| 2006/0097592 | A1 | 5/2006 | Sumi |
| 2007/0021582 | A1 | 1/2007 | Amano et al. |
| 2008/0080090 | A1 | 4/2008 | Gomyo et al. |

FOREIGN PATENT DOCUMENTS

| CN | 1614249 A | 5/2005 |
| CN | 1704202 A | 12/2005 |
| JP | 2002-284860 | 10/2002 |
| JP | 2004-015955 | 1/2004 |
| JP | 2005-114106 | 4/2005 |
| JP | 2006-081360 | 3/2006 |
| JP | 2006-191735 | 7/2006 |

* cited by examiner

*Primary Examiner* — Hanh N. Nguyen
(74) *Attorney, Agent, or Firm* — Volentine & Whitt, PLLC

(57) ABSTRACT

A method is for forming an oil-repellent film on a metallic part in a dynamic fluid pressure bearing mechanism used for a motor. The method includes applying a flowable oil-repellent agent on an application region of the metallic part; arranging an induction coil in the vicinity of the metallic part; and affixing the oil-repellent agent onto the metallic part by applying an induction heating to the metallic part by supplying an AC current with a frequency of about 5 to 100 kHz to the induction coil. Further, a motor includes a dynamic fluid pressure bearing mechanism including a metallic part on which an oil-repellent film is formed by the above method; a stator unit; and a rotor unit supported by the dynamic fluid pressure bearing mechanism in a manner rotatable with respect to the stator unit.

13 Claims, 28 Drawing Sheets

511
5112

J2
92
511

OIL-REPELLENT FILM FORMING METHOD, MOTOR MANUFACTURING METHOD AND MOTOR

FIELD OF THE INVENTION

The present invention relates to a technique of manufacturing a motor; and, more particularly, to a technique of forming an oil-repellent film on the parts of a motor, a technique of assembling the parts of a motor with an adhesive agent and a technique of sealing a bonding portion of a circuit board in a motor.

BACKGROUND OF THE INVENTION

Conventionally, in case a dynamic fluid pressure bearing mechanism is employed in a spindle motor (hereinafter referred to as a "motor"), the boundary between a lubricant filled in the dynamic fluid pressure bearing mechanism and an ambient air is formed within a gap of tapering shape to prevent leakage of the lubricant. In the dynamic fluid pressure bearing mechanism of this structure, it is typical that an oil-repellent agent is applied on portions close to a lubricant level to thereby form an oil-repellent film. Japanese Patent Application Publication No. 2004-289957A discloses a technique of forming an oil-repellent film by applying an oil-repellent agent solution composed of an oil-repellent agent dissolved in a solvent on a shaft and heating the oil-repellent agent solution within an oven to remove the solvent.

An adhesive agent is used for affixing various parts of a motor. For example, Japanese Patent Application Publication No. 2006-191735A discloses an outer rotor type spindle motor in which a rotary drive magnet is adhesively bonded to the inner circumferential surface of a rotor frame. A highly reactive adhesive agent such as an epoxy-based adhesive agent that is rapidly curable at a room temperature, one-component epoxy adhesive agent or the like is used as an adhesive agent. The adhesive agent is cured by heating the rotor frame with a high-frequency induction heating device. Further, Japanese Patent Application Publication No. 2004-15955A discloses a method in which an adhesive agent is applied on a stator core (i.e., an armature) or a fixing portion of a frame (a base portion of a motor) to which the stator core is to be mounted. The stator core is placed on the fixing portion, and then, an electric current is allowed to flow through the stator core so that a conductive wire generates heat. The adhesive agent is cured by use of the heat thus generated.

However, in case the parts of a motor applied with an oil-repellent agent are heated within an oven, it is time-consuming to elevate the temperature. This reduces the productivity and becomes an obstacle in automating a manufacturing process. Moreover, the production facilities grow large. Similarly, when the parts of a motor are affixed using a thermally curable adhesive agent, the task of heating them within an oven is time-consuming and becomes an obstacle in automating a manufacturing process.

Meanwhile, it is sometimes the case that the bonding portion of a circuit board attached to the base portion of a motor is sealed with a resin in order to secure insulation. The base portion is subjected to pre-heating if the resin used at this time has a low flowability. However, it also takes a large amount of time to pre-heat the base portion using a hot plate.

Further, in case of using the high-frequency heating as disclosed in Japanese Patent Application Publication No. 2006-191735A, an eddy current concentrated on the surface region is generated in the heated parts, which heats the surface region only. Consequently, a steep temperature variation occurs between the interior region and the surface region of the parts, which leads to a thermal deformation of the parts (namely, distortion or dimensional change in the parts).

SUMMARY OF THE INVENTION

In view of the above, the present invention provides a technique capable of rapidly and cost-effectively achieving the task of forming an oil-repellent film on the parts of a motor, the task of adhesively fixing the parts of a motor and the task of pre-heating a circuit board to seal the bonding portion thereof, which tasks have heretofore been performed by use of an oven or a hot plate. Further, the present invention also reduces deformation of the parts of a motor which may occur by heating.

In accordance with a first aspect of the present invention, there is provided a method for forming an oil-repellent film on a metallic part in a dynamic fluid pressure bearing mechanism used for a motor. The method includes applying a flowable oil-repellent agent on an application region of the metallic part; arranging an induction coil in the vicinity of the metallic part; and affixing the oil-repellent agent onto the metallic part by applying an induction heating to the metallic part by supplying an AC current with a frequency of about 5 to 100 kHz to the induction coil.

In accordance with a second aspect of the present invention, there is provided a method for manufacturing a motor, including applying a thermally curable adhesive agent on at least one of two parts of the motor, said at least one of the two parts being made of metal; bringing the two parts into contact with each other via the adhesive agent; arranging an induction coil in the vicinity of the two parts; and applying an induction heating to the induction coil by supplying an AC current with a frequency of about 5 to 100 kHz, thereby indirectly heating the adhesive agent to cure the adhesive agent.

In accordance with a third aspect of the present invention, there is provided a method for manufacturing motor, including affixing a lead line, which extends from a stator attached to a metallic base portion of a stator unit, to a board, which is attached to a surface of the base portion facing away from the stator, via a hole formed in the base portion; arranging an induction coil in the vicinity of the base portion; applying a preliminary induction heating to the base portion by supplying an AC current with a frequency of about 5 to 100 kHz to the induction coil; applying a flowable resin material on a bonding portion between the lead line and the board; and sealing the bonding portion by curing the resin material.

In accordance with the first aspect of the invention, use of the induction heating makes it possible to rapidly perform the task of affixing the oil-repellent agent to the metallic parts of the dynamic fluid pressure bearing mechanism. Furthermore, use of the AC current with a frequency of about 5 to 100 kHz makes it possible to reduce a thermal deformation in the metallic parts that might occur during the induction heating, and a low-price circuit can be used in the heating device.

In accordance with the second aspect of the invention, use of the induction heating makes it possible to rapidly cure the adhesive agent interposed between two parts of the motor. Furthermore, use of the AC current with a frequency of about 5 to 100 kHz makes it possible to reduce a thermal deformation in the parts that may occur during the induction heating, and a low-price circuit can be used in the heating device.

In accordance with the third aspect of the invention, use of the induction heating makes it possible to rapidly pre-heat the base portion. Furthermore, use of the AC current with a frequency of about 5 to 100 kHz makes it possible to reduce a thermal deformation in the base portion that might occur during the induction heating, and a low-price circuit can be used in the heating device.

BRIEF DESCRIPTION OF THE DRAWINGS

The above features of the present invention will become apparent from the following description of preferred embodiments, given in conjunction with the accompanying drawings, in which.

DETAILED DESCRIPTION OF THE PREFERRED EMBODIMENTS

Figure 1:
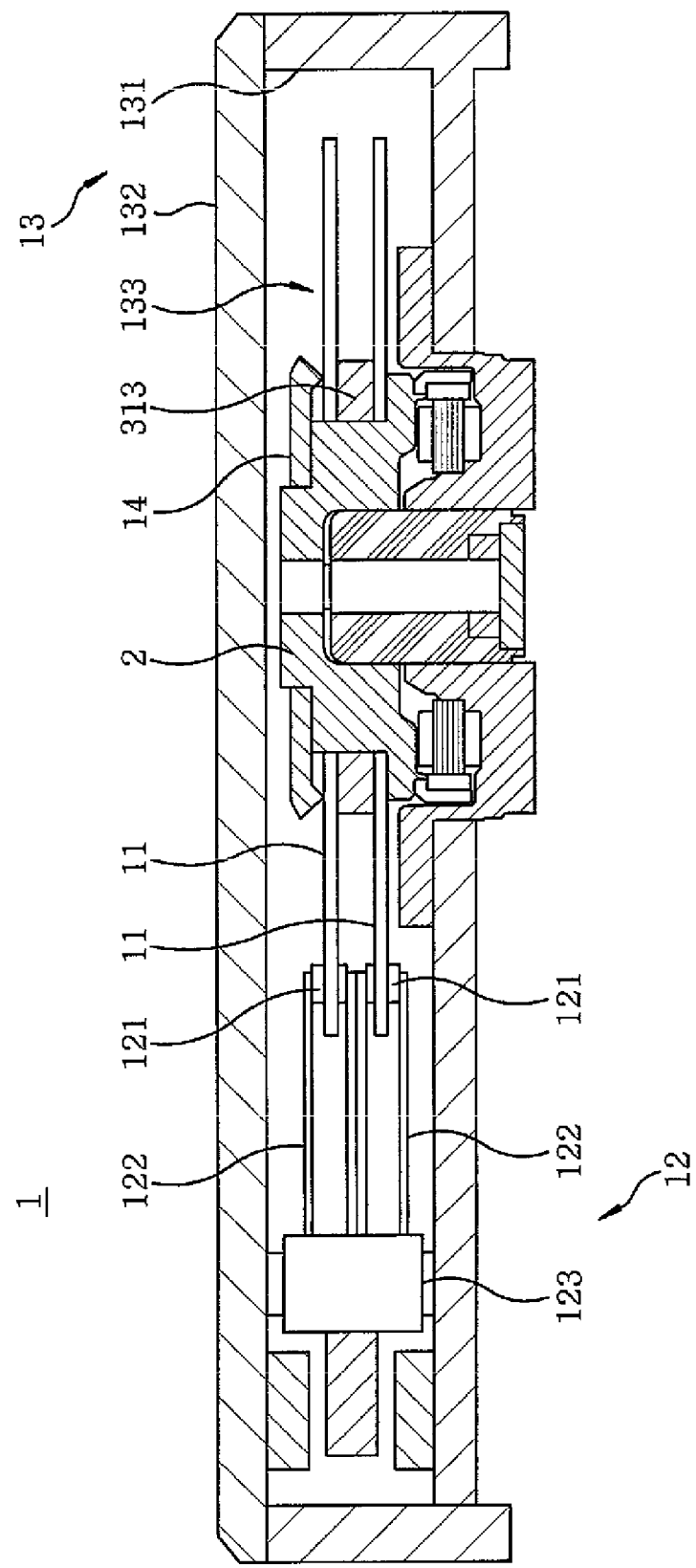
FIG. 1 is a sectional view showing a storage disk drive apparatus in accordance with a first embodiment of the present invention.

FIG. 1 is a vertical section view showing a storage disk drive apparatus 1 in accordance with a first embodiment of the present invention, which includes an electric spindle motor (hereinafter referred to as a "motor"). The storage disk drive apparatus 1 includes storage disks 11 for storing information; an access unit 12 for reading or writing (reading/writing or reading only) information from/to the storage disks 11; an electric motor 2 for rotating the storage disks 11; and a housing 13 for receiving the storage disks 11, the access unit 12 and the motor 2 within an internal space thereof to isolate them from the outside.

The housing 13 includes a first housing member 131 of cup-like shape having an opening formed in its upper portion and an inner bottom surface on which the motor 2 and the access unit 12 are mounted; and a second housing member 132 of plate-like shape for covering the opening of the first housing member 131 to define an internal space 133. In the storage disk drive apparatus 1, the second housing member 132 is affixed to the first housing member 131 to form the housing 13. The internal space 133 is a clean space in which dust is extremely rare.

The storage disks 11 are mounted on the upper side of the motor 2 and are fixed to the motor 2 by means of a clamp 14 and an annular spacer 313. The access unit 12 includes heads 121 for accessing the storage disks 11 to magnetically reading and/or writing the information; arms 122 for supporting the heads 121; and a head moving mechanism 123 for moving the arms 122 so that the heads 121 can be moved relative to the storage disks 11 and the motor 2. With this construction, the heads 121 gain access to desired positions on the storage disks 11 in a state that they come close to the storage disks 11 under rotation, thereby performing the task of reading or writing information.

Figure 2:
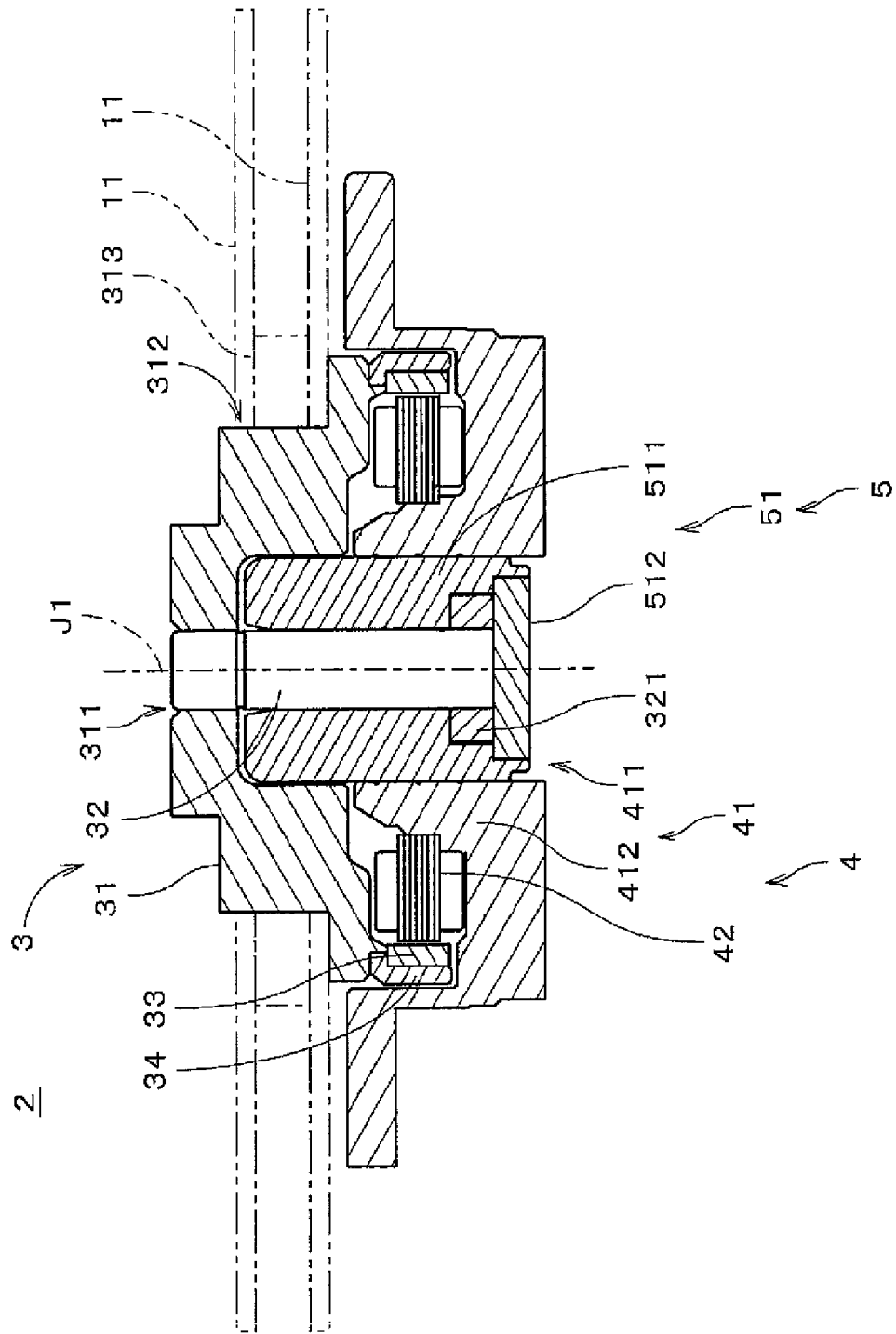
FIG. 2 is a sectional view of a motor.

FIG. 2 is a vertical section view of the motor 2, in which the storage disks 11 and the spacer 313 fixed to the motor 2 are indicated by double-dotted chain lines. The motor 2 is of an outer rotor type and includes a rotor unit 3 and a stator unit 4. The rotor unit 3 is supported by a dynamic fluid pressure bearing mechanism 5 using a lubricant (hereinafter referred to as a "bearing mechanism 5") in a manner rotatable about a central axis J1 of the motor 2 with respect to the stator unit 4. In the following description, a direction toward the rotor unit 3 along the central axis J1 will be denoted by the term "upper", and a direction toward the stator unit 4 along the central axis J1 will be designated by the term "lower", for convenience. However, it is not necessary for the central axis J1 to coincide with the direction of gravity.

The rotor unit 3 includes a rotor hub 31 of substantially disk-like shape; a shaft 32 fixed to the central region of the rotor hub 31; a rotor magnet 33 attached to the rotor hub 31 to be centered at the central axis J1: and a substantially cylindrical yoke 34 protruding downwardly from the outer circumference of the rotor hub 31; the rotor magnet 33 attached to the inner surface of the yoke 34. The rotor hub 31 is made of, e.g., stainless steel, and has a cylinder portion 312 with an outer surface on which two storage disks 11 fit with the annular spacer 313 interposed therebetween.

The shaft 32 is made of, e.g., stainless steel, and is press-fitted into and adhesively bonded to a central opening 311 of the rotor hub 31. A substantially annular thrust plate 321 is attached to the lower tip end portion of the shaft 32. The rotor magnet 33 is an annular magnet magnetized with multiple poles, and is designed to generate rotational force (torque) centered at the central axis J1 between itself and the below-mentioned armature 42.

The stator unit 4 includes as its base portion a base bracket 41 having a bore 411 formed in its central region, and a stator 42 attached to a holder 412 formed to surround the bore 411. The base bracket 41 is made of, e.g., aluminum alloy. A cylindrical bottom-closed sleeve portion 51 is inserted into the bore 411 and fixed thereto by a thermally curable adhesive agent. The stator 42 includes a core formed of, e.g., laminated silicon steel plates, and a coil wound around a plurality of teeth on the core.

The sleeve portion 51 includes a substantially cylindrical sleeve 511 made of, e.g., stainless steel and centered at the central axis J1; and a seal cap 512 for closing a bottom opening of the sleeve 511. The shaft 32 and the thrust plate 321 are held within the sleeve 511 and the seal cap 512. In the sleeve portion 51, small gaps are formed between the inner surface of the sleeve 511 and the outer surface of the shaft 32, between the sleeve 511 and the upper and outer surfaces of the thrust plate 321, and between the upper surface of the seal cap 512 and the lower surface of the thrust plate 321. A lubricant is seamlessly filled in these gaps. In the motor 2, the bearing mechanism 5 is constructed by the sleeve 511, the seal cap 512, the shaft 32, the thrust plate 321 and the lubricant.

Figure 3:
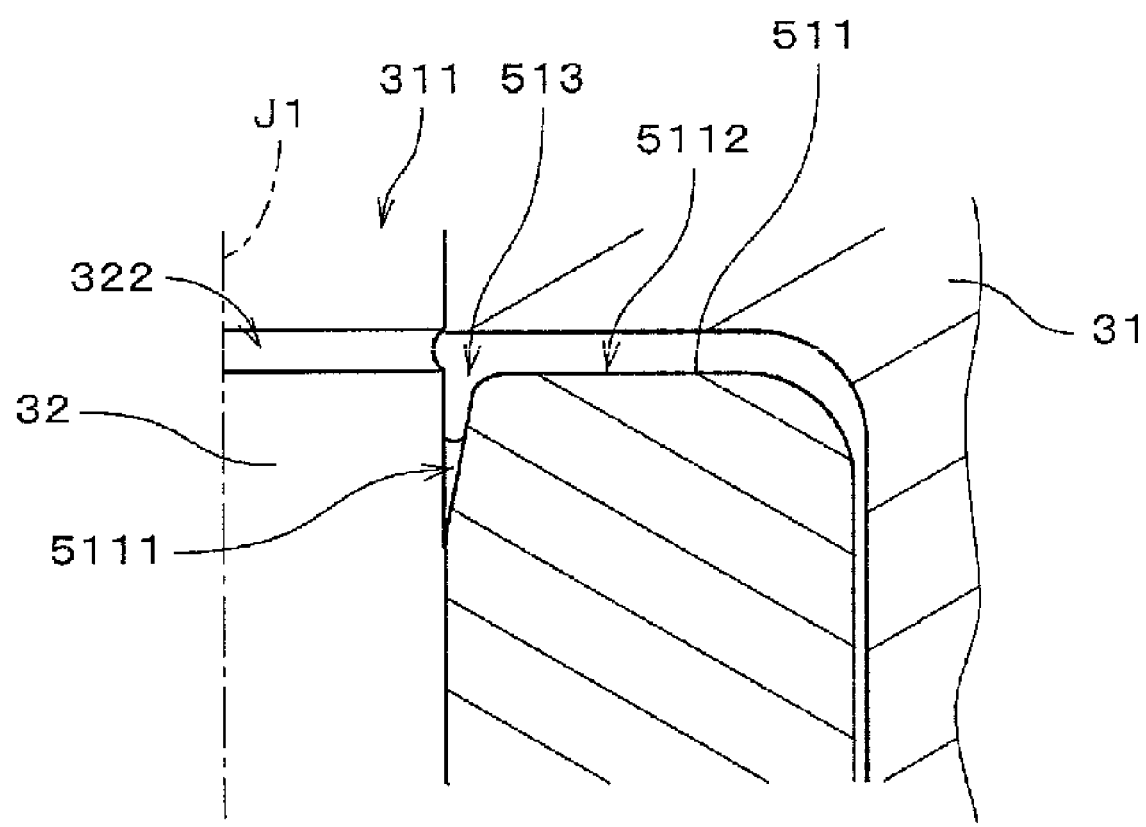
FIG. 3 is a view enlargedly illustrating the upper portion of a sleeve and its neighborhood.

FIG. 3 is a view enlargedly showing the upper portion of the sleeve 511 and its neighborhood. In the upper portion of the inner surface of the sleeve 511 is formed a slanting surface 5111 whose diameter is gradually increased in an upward direction. Thus, a tapering gap 513 whose width is gradually increased in the upward direction is formed between the slanting surface 5111 and the outer surface of the shaft 32. An oil-repellent agent is applied on an upper surface 5112 of the sleeve 511 and on an annular groove portion 322 formed along the outer surface of the shaft 32 that is centered at the central axis J1, thereby forming an oil-repellent film. Leakage of the lubricant is prevented by the oil-repellent film and the tapering seal having a boundary surface formed within the tapering gap 513.

Grooves (e.g., herringbone grooves) for generating a dynamic fluid pressure in the lubricant are formed on the inner surface of the sleeve 511 above the thrust plate 321, thereby forming a radial bearing portion between the outer surface of the shaft 32 and the inner surface of the sleeve 511. Further, the groove for generating a dynamic fluid pressure may be formed on the outer surface of the shaft 32. Grooves (e.g., spiral grooves) for generating a pressure that acts against the lubricant toward the central axis J1 during rotation of the rotor unit 3 are formed on the upper and lower surfaces of the thrust plate 321. Thus, a thrust bearing portion is provided between the upper surface of the thrust plate 321 and the surface of the sleeve 511 opposite thereto, and between the lower surface of the thrust plate 321 and the upper surface of the seal cap 512.

In the motor 2, the shaft 32 is supported on the sleeve portion 51 via the lubricant in a non-contacting manner by the thrust bearing portion and the radial bearing portion in the bearing mechanism 5. Thus, the rotor unit 3 and the storage disks 11 mounted to the rotor unit 3 are rotated with respect to the stator unit 4 with increased accuracy and in a reduced noise.

Next, a method of forming an oil-repellent film on the shaft 32 will be described with reference to FIG. 4. First, a flowable oil-repellent agent is applied on the groove portion 322 (see FIG. 3) of the shaft 32, which is an application region, throughout the entire circumference thereof (step S11). When the motor 2 is assembled, the groove portion 322 is located slightly above the boundary surface of the lubricant formed within the tapering gap 513 as illustrated in FIG. 3. The oil-repellent agent needs not to be applied exactly on the groove portion 322, and a small amount thereof may extrude toward the region above the groove portion 322 (namely, the region of the shaft 32 to be brought into contact with the opening 311 of the rotor hub 31). A fluorine-based resin such as polytetrafluoroethylene (PTFE) or the like dissolved in a fluorine compound solvent is used as the oil-repellent agent, for example.

Figure 5:
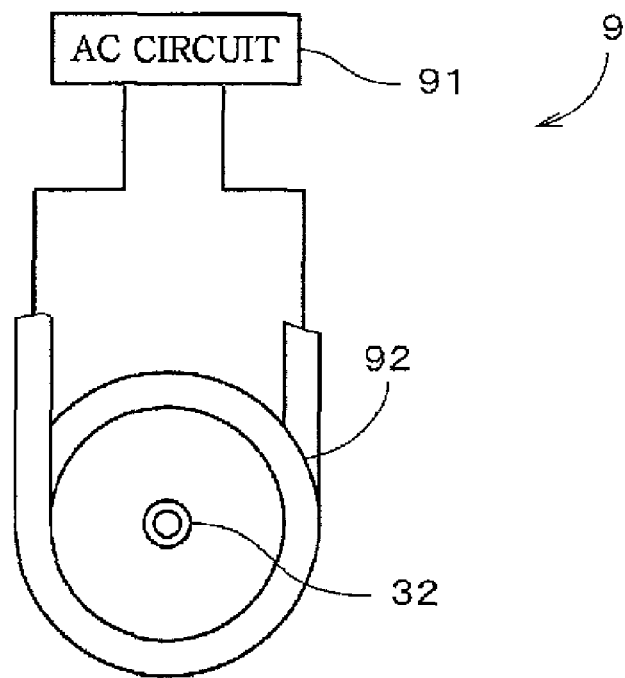
FIG. 5 is a view showing the placement of a shaft relative to an induction coil.
Figure 6:
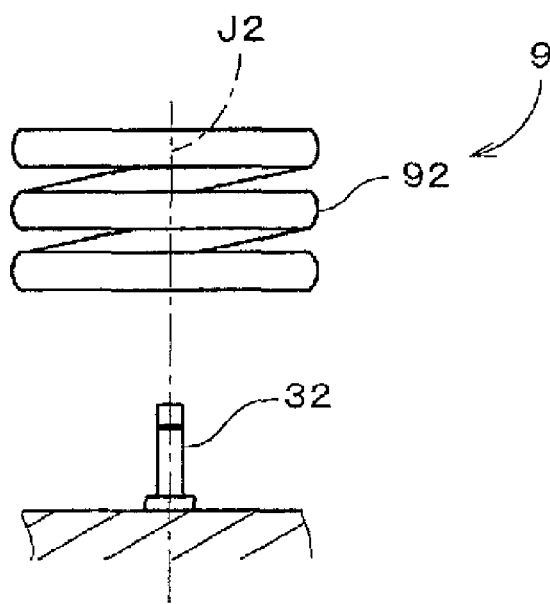
FIG. 6 is another view showing the placement of the shaft relative to the induction coil.

Then, the shaft 32 is loaded to a heating device. FIGS. 5 and 6 are plan and front views illustrating the placement of the shaft 32 relative to a heating device 9. The heating device 9 is what is known as an induction heating device, and includes an AC circuit 91 for generating an AC current and an induction coil 92 connected thereto. In the illustrated example of FIG. 6, the winding number of the induction coil 92 is three, and the shaft 32 is arranged below and near the induction coil 92 along a central axis J2 of the latter (step S12). In practice, the induction coil 92 is covered with an insulation resin. Description will be made later on a circuit structure of the heating device 9.

Figure 7:
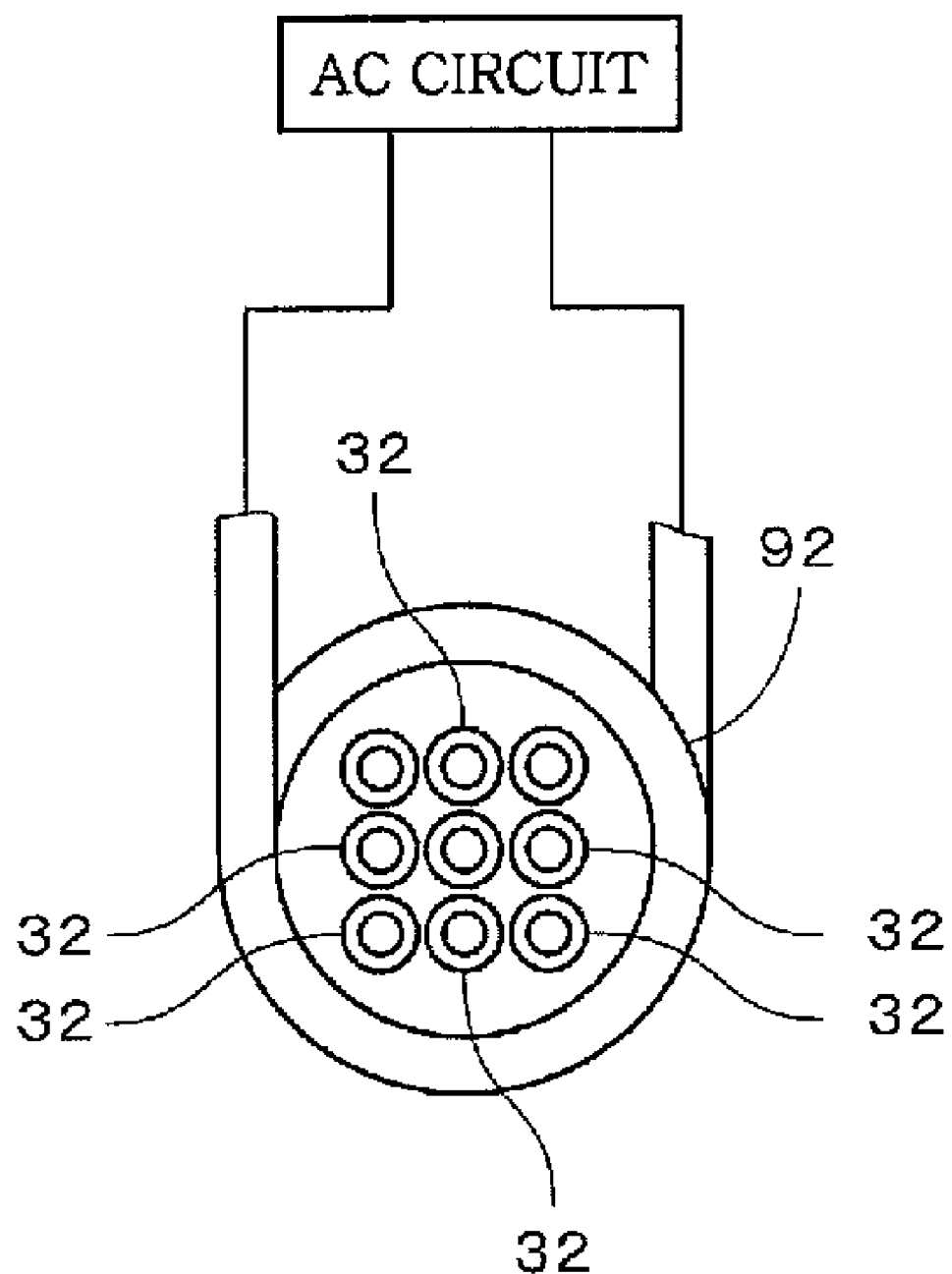
FIG. 7 is a view showing the placement of shafts relative to an induction coil.

Then, an AC current with a frequency of about 15 kHz is supplied from the AC circuit 91 to the induction coil 92. An eddy current is generated in the shaft 32 by the magnetic flux that the induction coil 92 generates. The shaft 32 is inductively heated by the eddy current (step S13). As a result, the oil-repellent agent is cured to be affixed to the groove portion 322 of the shaft 32 (that is to say, an oil-repellent film is formed in the groove portion 322). If, for example, the shaft 32 is heated to a temperature of about 120° C., the oil-repellent agent is cured within a few seconds. Referring to FIG. 7, a plurality of shafts 32 is arranged below the induction coil 92 and is heated at one time, whereby a plurality of oil-repellent films can be simultaneously formed in the shafts 32.

Figure 8:
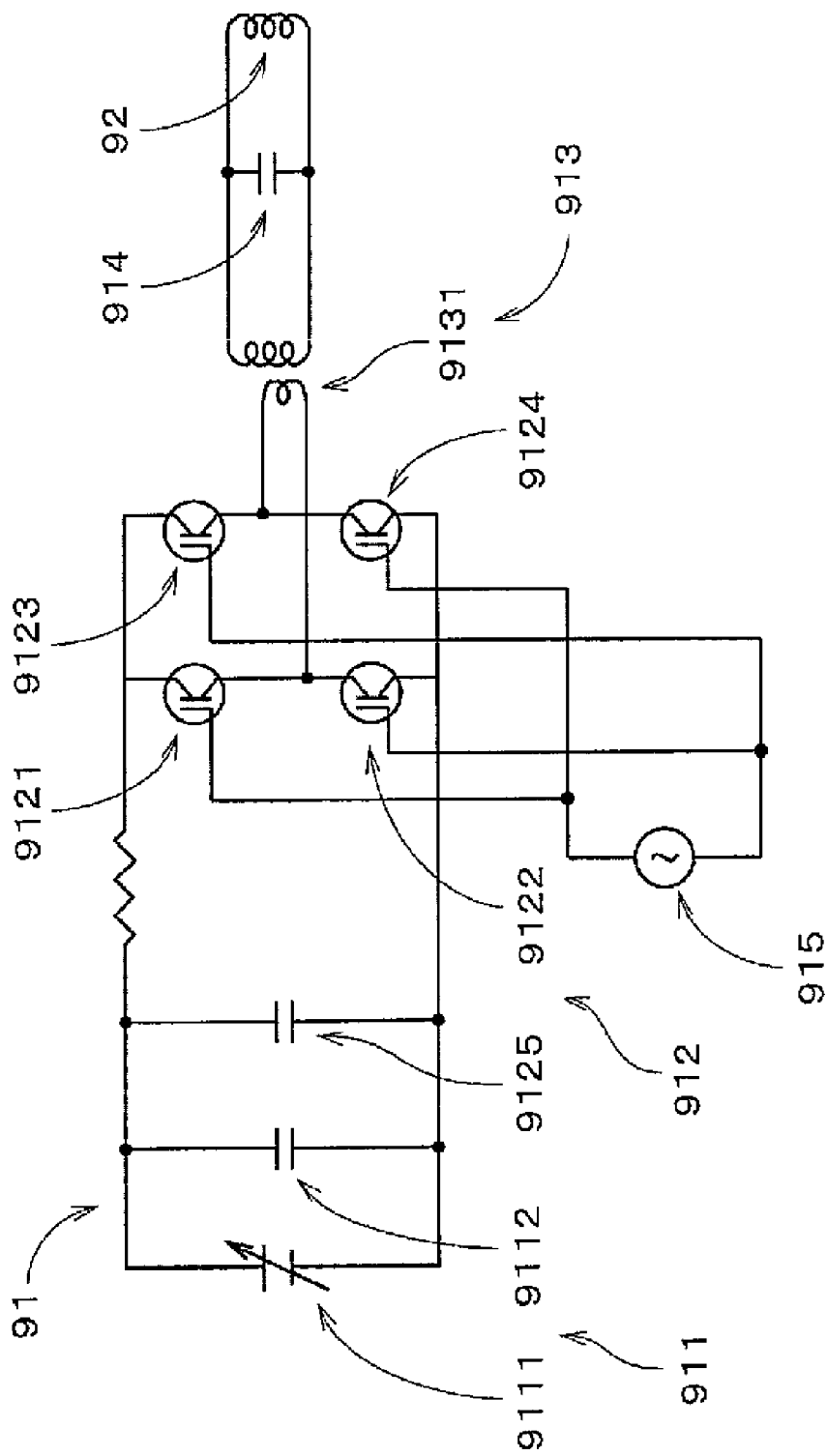
FIG. 8 is a conceptual diagram showing a circuit of a heating device.

FIG. 8 is a view schematically illustrating a circuit of the heating device 9. The AC circuit 91 includes a power supply unit 911; an AC current generation unit 912 for generating an AC current; and a voltage transformer unit 913 for transforming the voltage of the AC current. The power supply unit 911 is provided with a DC power supply 9111 to which power supply capacitors 9112 are connected in parallel. The AC current generation unit 912 is provided with four transistors 9121, 9122, 9123 and 9124. Commercially available general-purpose transistors, e.g., insulation gate bipolar transistors (IGBT), may be used as the transistors 9121 through 9124.

In the AC current generation unit 912, the transistors 9121 and 9122 are connected in series. So are the transistors 9123 and 9124. The pair of transistors 9121 and 9122 are connected in parallel to the pair of transistors 9123 and 9124. The voltage transformer unit 913 includes an input coil 9131 whose terminals are respectively connected to between the transistors 9121 and 9122, and between the transistors 9123 and 9124.

The transistors 9121 and 9124 have gates connected to one end of an AC power supply 915. Likewise, the transistors 9122 and 9123 have gates connected to the other end of the AC power supply 915. An AC current with a frequency of about 15 kHz is supplied from the AC power supply 915 to the AC current generation unit 912. Therefore, an electric current flowing through the transistor 9121, the coil 9131 in the voltage transformer unit 913 and the transistor 9124 sequentially in this order is alternately switched with an electric current flowing through the transistor 9122, the coil 9131 and the transistor 9123 sequentially in this order. Consequently, the DC current supplied from the power supply unit 911 is converted to an AC current. A speed-up capacitor 9125 is connected in parallel to the AC current generation unit 912, which ensures that the switching operation is performed rapidly in the AC current generation unit 912.

The AC current generated by the AC current generation unit 912 is supplied to the induction coil 92 amplifying the voltage by the voltage transformer unit 913. The induction coil 92 cooperates with a capacitor 914 to form a resonance circuit, thereby removing the noise attributable to the generation of the AC current. In the heating device 9, the AC current generating circuit of a simple structure is constructed using the transistors 9121 through 9124. Therefore, the AC circuit 91 can be produced in a cost-effective manner, as compared to a case where a plurality of transistors need to be connected in parallel in keeping with the high current required for a power MOS (Metal Oxide Semiconductor) transistor or the like.

Figure 9:
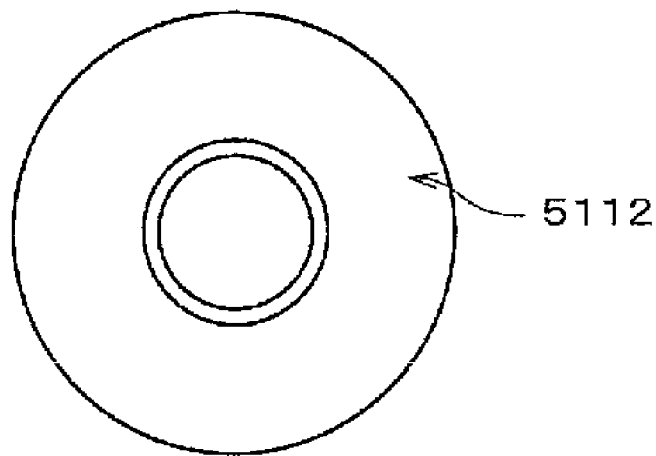
FIG. 9 is a plan view showing a sleeve.
Figure 10:
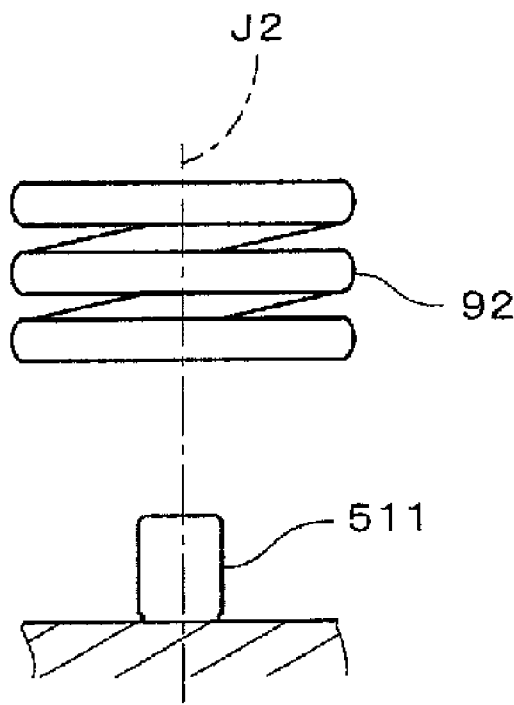
FIG. 10 is a view showing the placement of the sleeve relative to the induction coil.

Next, a method of forming an oil-repellent film on the sleeve 511 will be described with reference to FIG. 4. As illustrated in FIG. 9, the upper surface 5112 of the sleeve 511 is an application region on which the oil-repellent agent is to be applied. As in the method of forming the oil-repellent film on the shaft 32 (see FIG. 5), a flowable oil-repellent agent (which may be the same one as applied on the shaft 32) is first applied on the upper surface 5112 of the sleeve 511 (step S11). As shown in FIG. 10, the sleeve 511 is arranged below and near the induction coil 92 along the central axis J2 of the latter (step S12).

Then, an AC current with a frequency of about 15 kHz is supplied from the AC circuit 91 (see FIG. 5) to the induction coil 92. An eddy current flowing into the deep portion of the sleeve 511 is generated by the magnetic flux of the induction coil 92 to thereby inductively heat the sleeve 511 in its entire region (step S13). As a result, the oil-repellent agent is cured to be affixed to the upper surface 5112 of the sleeve 511 (that is to say, an oil-repellent film is formed on the upper surface 5112 of the sleeve 511). In the process of forming the oil-repellent film on the sleeve 511, a plurality of sleeves 511 may be collectively heated to simultaneously form a plurality of oil-repellent films on the sleeves 511 in the same manner as applied to the shaft 32 (this holds true also in case of the metal parts relating to second modified examples of the first and second embodiments).

Description has been made hereinabove on the structure of the motor 2 and the methods of forming the oil-repellent films on the shaft 32 and the sleeve 511, which relate to the first embodiment of the present invention. Use of the induction heating of the induction coil 92 in forming the oil-repellent films makes it possible to rapidly perform the task of affixing the oil-repellent agent to the shaft 32 and the sleeve 511 of the bearing mechanism 5, as compared to a case where the heating is performed with an oven or the like (in which case it takes, e.g., one hour to reach about 120° C.). This is particularly true in case where a plurality of shafts 32 or a plurality of sleeves 511 are heated at one time. Such rapid heating makes it easy to automate the production facilities (this holds true also in case of the embodiments to be described later).

While an AC current with a frequency of about 15 kHz may preferably be used for the heating device 9, it is also possible to use an AC current of different frequencies. For preventing the possibility that only the surface regions are heated in the shaft 32 or the sleeve 511, and for sufficiently heating the shaft 32 or the sleeve 511 within a short period of time, the frequency of the AC current is selected in the range from about 5 to about 100 kHz; and, more preferably, in the range from about 5 to about 20 kHz.

By restraining the frequency range as above, it is possible to prevent generation of an eddy current flowing only in the surface region of the shaft 32 or the sleeve 511. Therefore, it is also possible to avoid a steep temperature variation between the surface and the interior in the shaft 32 and the sleeve 511. This helps to reduce thermal deformation of the shaft 32 and the sleeve 511. Further, the heating device 9 uses a relatively low frequency among the frequencies of the AC current typically used in the induction heating. Thus, the influence of electromagnetic waves (noises) on the peripheral devices can be reduced.

Figure 11:
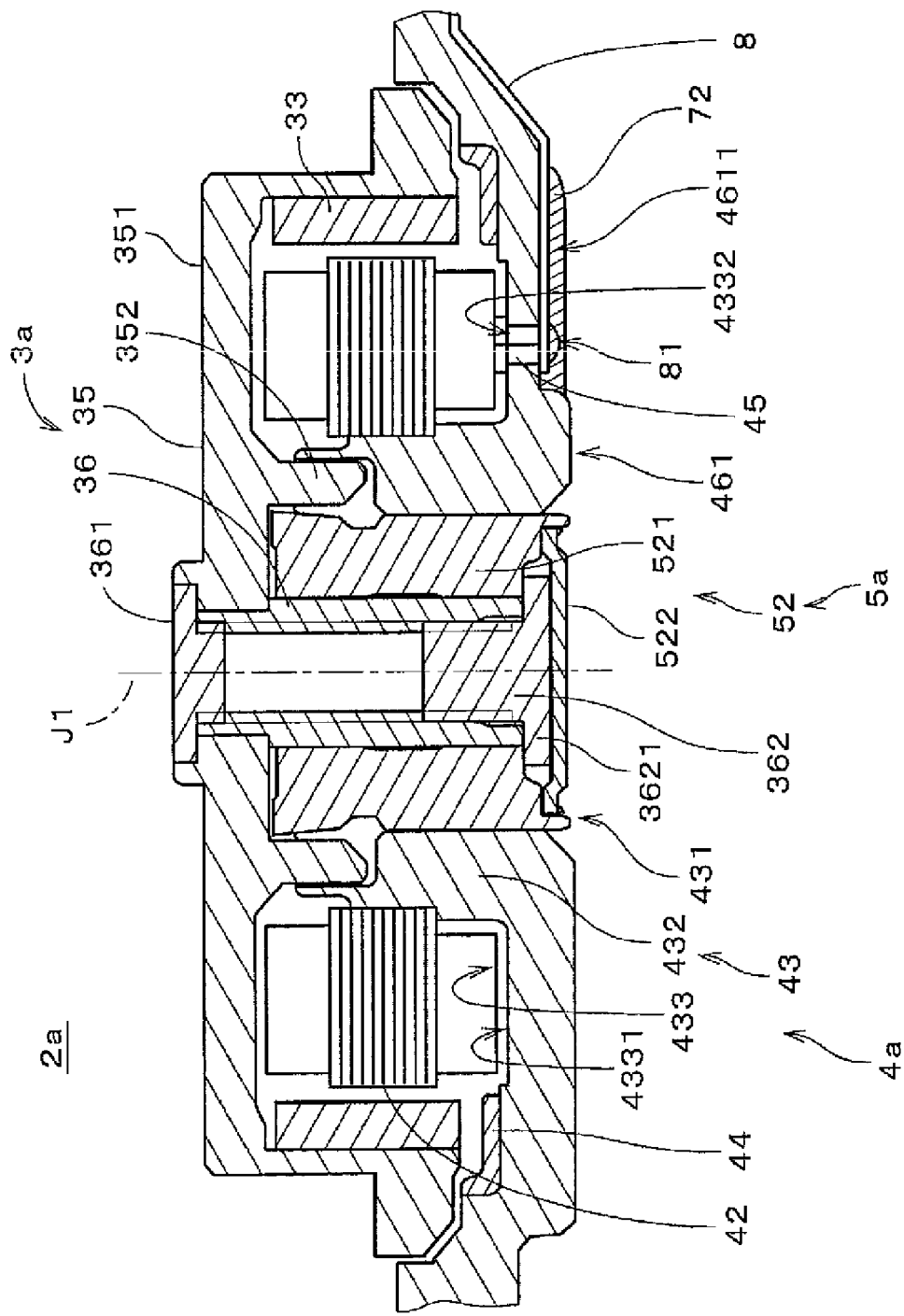
FIG. 11 is a sectional view showing a motor in accordance with a first modified example of the first embodiment of the present invention.

FIG. 11 is a sectional view showing a motor 2*a* in accordance with a first modified example of the first embodiment. Just like the motor 2 of the first embodiment, the motor 2*a* is of an outer rotor type and includes a rotor unit 3*a* as a rotating assembly and a stator unit 4*a* as a fixed assembly. The rotor unit 3*a* is supported by a dynamic fluid pressure bearing mechanism 5*a* via a lubricant (hereinafter referred to as a "bearing mechanism 5*a*") in a manner rotatable about a central axis J1 of the motor 2*a* with respect to the stator unit 4*a*.

The motor 2*a* includes a rotor hub 35, a shaft 36, a base plate 43 and a sleeve portion 52, which respectively differ in shape and structure from the rotor hub 31, the shaft 32, the base bracket 41 and the sleeve portion 51 of the motor 2. The stator unit 4*a* further includes a thrust yoke 44 arranged on the base plate 43. The base plate 43 is made of, e.g., aluminum and forms a part of the housing of the storage disk drive apparatus that carries the motor 2*a*. An access unit (designated by reference numeral 12 in FIG. 1) and other components are mounted on the base plate 43. The remaining structures of the motor 2*a* are substantially the same as those of the motor 2. The same components are designated by like reference numerals.

The rotor hub 35 is of a substantially top-closed cylindrical shape, and is made of, e.g., stainless steel. The shaft 36 is press-fitted and adhesively attached to the center of the rotor hub 35. The rotor hub 35 has an radially extending disk-like portion 351 centered at the central axis J1, and a cylinder portion 352 protruding downwardly (toward the stator unit 4*a*) from the lower surface of the disk-like portion 351 near the central axis J1 (more exactly, near the outer circumference of the sleeve 521 of the sleeve portion 52). The shaft 36 is of a cylindrical shape having openings at its opposite ends. A thread groove is formed on the inner surface of the shaft 36 throughout the entire length of the shaft 36. A screw 361 and a thrust plate 362 are threadedly coupled to the upper and lower ends of the shaft 36.

A bore 431 is formed at the center of the base plate 43. The sleeve 521 is fixed to the bore 431. A stator 42 is press-fitted and adhesively secured to the outer surface of a holder 432, which is a cylindrical portion formed around the bore 431. A downwardly depressed recess portion 433 is formed outwardly of the holder 432. A through-hole 4332 extending through the thickness of the base plate 43 is formed at the bottom surface 4331 of the recess portion 433. A flexible circuit board 8 (hereinafter referred to as a "board 8") is attached to the rear surface 461 of the base plate 43 (which is the surface facing away from the stator 42) so that it adjoins to the through-hole 4332. The region of the base plate 43 to which the board 8 is attached (hereinafter referred to as a "board attachment region 4611") is depressed upwardly from the neighboring region.

In the base plate 43, a lead line extending from the stator 42 is fixed to the board 8 via a bush 45 fitted to the through-hole 4332. The bonding portion 81 at which the board 8 is affixed to the lead line of the stator 42 is sealed by a resin material 72 to be insulated from its environment. The resin material 72 is formed so as not to protrude downwardly further than the lowermost surface of the base plate 43.

An annular thrust yoke 44 is attached to the bottom surface 4331 of the base plate 43. The thrust yoke 44 is positioned radially outwardly of the through-hole 4332 and is opposite to the rotor magnet 33 of the rotor unit 3a. The thrust yoke 44 is fixed in place by means of a thermally curable adhesive agent. The thrust yoke 44 is made of a silicon steel plate so that a magnetic attraction force is generated between the thrust yoke 44 and the rotor magnet 33. This ensures that the rotor unit 3a is biased downwardly (toward the stator unit 4a).

Figure 12:
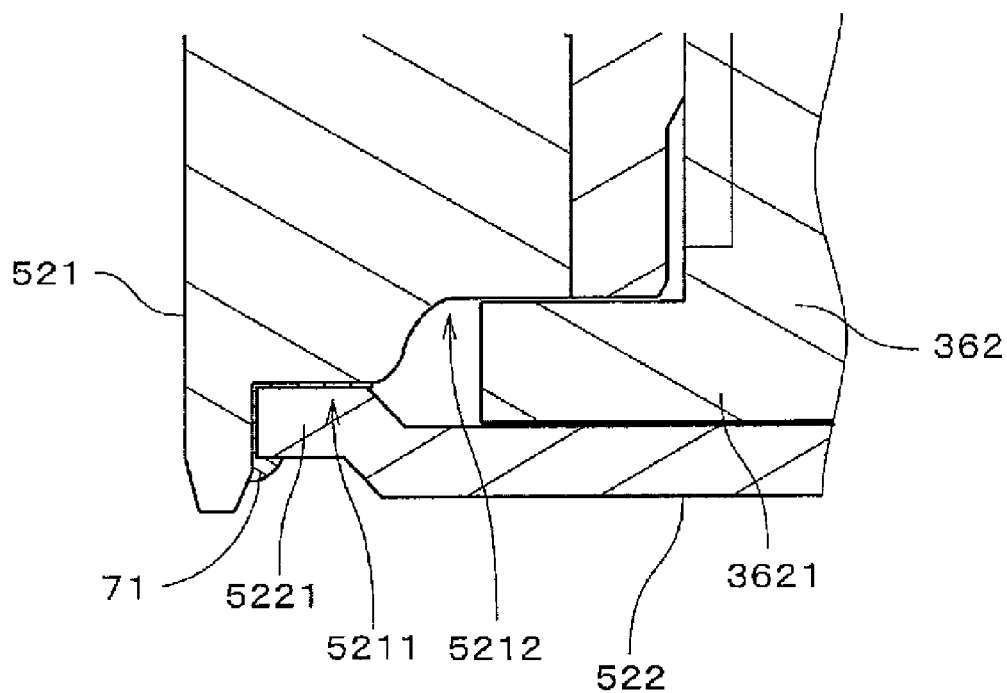
FIG. 12 is a view enlargedly showing the lower portion of the sleeve and its neighborhood.

The sleeve portion 52 includes a substantially cylindrical sleeve 521 coaxial with the central axis J1, and a substantially disk-like seal cap 522 for closing the bottom opening of the sleeve 521. The sleeve 521 and the seal cap 522 are made of, e.g., stainless steel. As shown in FIG. 12, a large-diameter recess portion is formed in the lower portion of the sleeve 521 and a small-diameter recess portion is formed inwardly of the large-diameter recess portion. Two step portions 5211 and 5212 are formed by the two recess portions. The seal cap 522 has a peripheral edge portion 5221 that slightly protrudes in an upward direction. The seal cap 522 and the sleeve 521 are adhesively fixed to each other by a thermally curable adhesive agent 71 in such a state that the peripheral edge portion 5221 makes contact with the step portion 5211 of the sleeve 521 formed in a radially outward direction. The thrust plate 362 has a disk-like portion 3621 received in a vertical gap formed between the inner step portion 5212 of the sleeve 521 and a portion of the seal cap 522 lying radially inward of the peripheral edge portion 5221.

Figure 13:
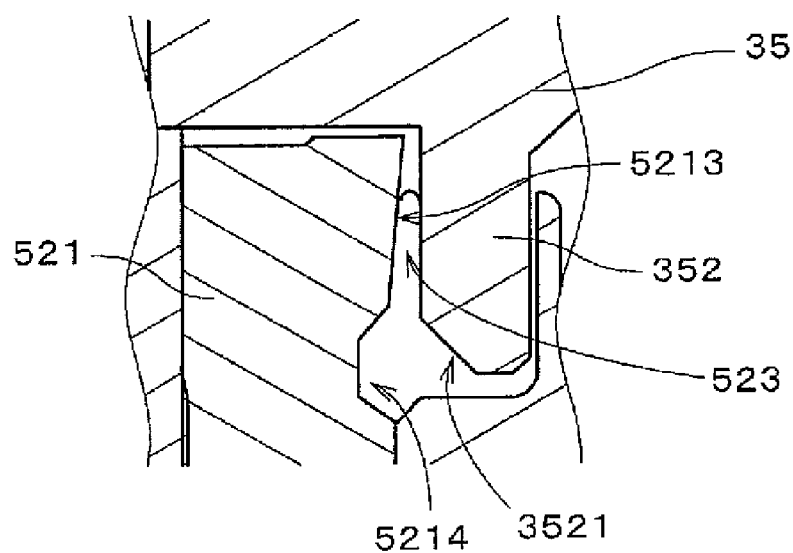
FIG. 13 is a view enlargedly showing the upper portion of the sleeve and its neighborhood.

Referring to FIG. 13, the upper portion of the outer surface of the sleeve 521 is formed into a slanting surface 5213 whose diameter is gradually increased in the upward direction. A tapering gap 523 whose width is gradually increased in the downward direction is formed between the slanting surface 5213 and the inner surface of the cylinder portion 352 of the rotor hub 35. An annular groove portion 5214 coaxial with the central axis J1 (see FIG. 11) is formed on the outer surface of the sleeve 521 below the slanting surface 5213. A slanting surface 3521 whose diameter is gradually increased in the downward direction is formed in the lower portion of the cylinder portion 352 (namely, in the tip end region between the inner surface and the outer surface of the cylinder portion 352). An oil-repellent film is formed on the groove portion 5214 of the sleeve 521 and the slanting surface 3521 of the rotor hub 35.

In the motor 2a shown in FIG. 11, a lubricant is seamlessly filled in the small gaps between the outer surface of the sleeve 521 and the inner surface of the cylinder portion 352 of the rotor hub 35, between the upper surface of the sleeve 521 and the lower surface of the disk-like portion 351 of the rotor hub 35, between the inner surface of the sleeve 521 and the outer surface of the shaft 36, between the upper surface of the disk-like portion 3621 of the thrust plate 362 and the surface of the sleeve 521 opposite thereto, and between the upper surface of the seal cap 522 and the lower surface of the disk-like portion 3621 of the thrust plate 362. Thus, a bearing mechanism 5a is constructed by the sleeve 521, the seal cap 522, the rotor hub 35, the shaft 36, the thrust plate 362 and the lubricant. Leakage of the lubricant is prevented by the oil-repellent film and the tapering seal whose boundary surface is formed in the tapering gap 523 between the sleeve 521 and the rotor hub 35 as illustrated in FIG. 13.

Next, a method of forming oil-repellent films on the rotor hub 35 and the sleeve 521 will be described with reference to FIG. 4. The process of forming an oil-repellent film on the rotor hub 35 is substantially the same as that of the first embodiment. First, a flowable oil-repellent agent is applied on the slanting surface 3521 of the rotor hub 35 (see FIG. 13), which is an application region, located in the lower portion of the cylinder portion 352 (step S11). When the motor 2a is assembled, the slanting surface 3521 is positioned slightly below the boundary surface of the lubricant formed within the tapering gap 523 as illustrated in FIG. 13. The oil-repellent agent needs not to be applied exactly on the slanting surface 3521, and it may extrude to other regions in the lower portion of the cylinder portion 352.

Figure 14:
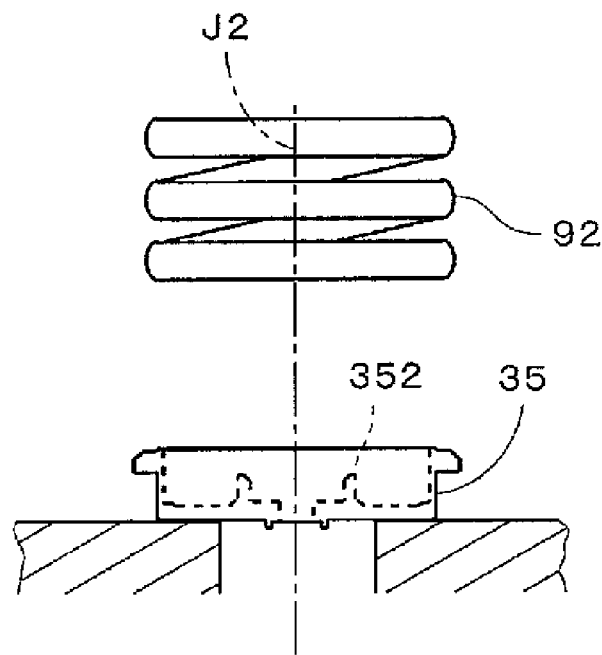
FIG. 14 is a view illustrating the placement of a rotor hub relative to the induction coil.

Then, the rotor hub 35 is loaded to a heating device. FIG. 14 is a front view illustrating the placement of the rotor hub 35 relative to a heating device. The heating device is the same as the heating device 9 shown in FIGS. 5 and 6. The rotor hub 35 is arranged below and near the induction coil 92 along the central axis J2 of the latter (step S12). An AC current with a frequency of about 15 kHz is supplied from the AC circuit 91 (see FIG. 5) to the induction coil 92. The rotor hub 35 is inductively heated by the magnetic flux generated by the induction coil 92 (step S13). As a result, the oil-repellent agent is cured to be affixed to the slanting surface 3521 (see FIG. 13) of the cylinder portion 352 in the rotor hub 35 (that is to say, an oil-repellent film is formed in the slanting surface 3521).

Figure 15:
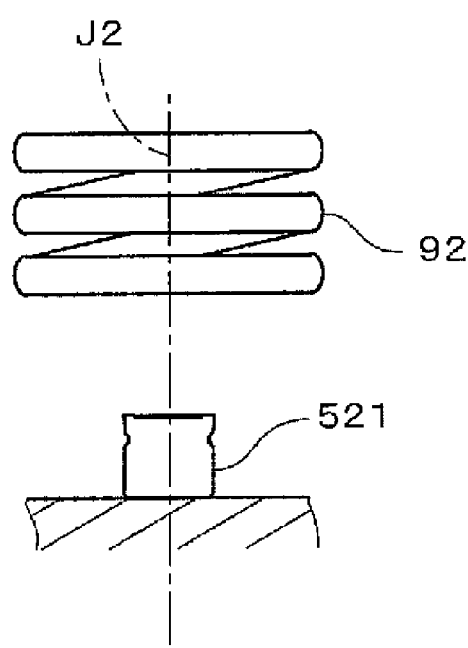
FIG. 15 is a view illustrating the placement of the sleeve relative to the induction coil.

The process of forming an oil-repellent film on the sleeve 521 is substantially the same as the process of the first embodiment. First, an oil-repellent agent is applied on the groove portion 5214 of the outer surface of the sleeve 521, which is an application region (step S11). When the motor 2a is assembled, the groove portion 5214 is positioned slightly below the boundary surface of the lubricant formed within the tapering gap 523 as illustrated in FIG. 13. Next, as shown in FIG. 15, the sleeve 521 is arranged below and near the induction coil 92 along the central axis J2 of the latter (step S12). An AC current is supplied from the AC circuit 91 (see FIG. 5) to the induction coil 92 to thereby inductively heat the sleeve 521 (step S13). Consequently, the oil-repellent agent is cured to be affixed to the groove portion 5214 of the sleeve 521.

In the motor 2a described above, use of the induction heating of the induction coil 92 for forming the oil-repellent films on the rotor hub 35 and the sleeve 521 of the bearing mechanism 5a makes it possible to perform the task of affixing the oil-repellent agent within a shortened period of time, as compared to a case where the heating is performed with an oven or the like. If a plurality of rotor hubs 35 or sleeves 521 are heated at one time, it is possible to fix the oil-repellent agent to the metal parts (the rotor hub 35 and the sleeve 521) within a more shortened period of time.

In the heating device 9, the frequency of the AC current applied to the induction coil 92 is lower than or equal to about 100 kHz (and higher than or equal to 5 kHz for practical use). Therefore, it is possible to avoid a steep temperature variation between the surface region and the interior region of the rotor hub 35 or the sleeve 521. This helps to reduce a thermal deformation in the rotor hub 35 and the sleeve 521 caused by heating. Furthermore, use of the low frequency AC current saves the production cost of the AC circuit 91 having the transistors 9121 through 9124 (see FIG. 8).

Figure 16:
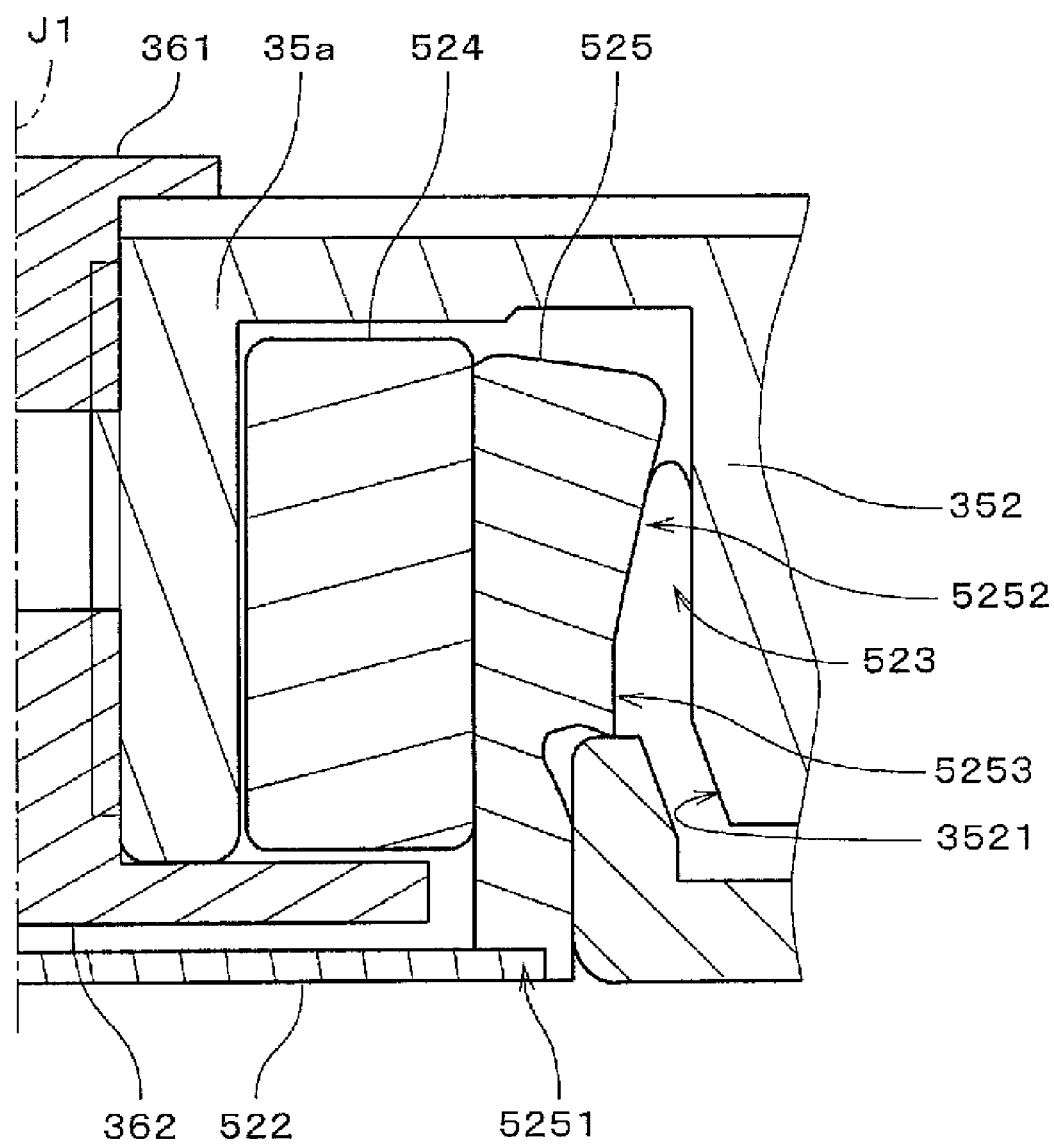
FIG. 16 is a view showing a variant of the motor in accordance with the first modified example of the first embodiment.

FIG. 16 is a view showing a variant of the bearing mechanism 5a of the motor 2a in accordance with the first modified example of the first embodiment, in which view the cross-section of the bearing mechanism 5a is illustrated on a partially enlarged scale. The bearing mechanism 5a shown in FIG. 16 includes a lubricant-impregnated porous sleeve 524 as a substitute of the sleeve 521 shown in FIG. 11; and a substantially cylindrical sleeve housing 525 that almost covers the outer surface of the sleeve 524. The sleeve housing 525 is made of a metallic material such as stainless steel or the like. The shaft 36 and the rotor hub 35 shown in FIG. 11 are formed into a single member. In the following description, the shaft and the rotor hub will be collectively referred to as a "hub portion 35a".

Provided in the lower portion of the sleeve housing 525 is a recess portion that defines a step portion 5251. The seal cap 522 is attached to the sleeve housing 525 by adhesively bonding the peripheral edge portion thereof to the step portion 5251 in a mutually contacting relationship. Thus, the bottom opening of the sleeve housing 525 is closed by the seal cap 522. A slanting surface 5252 whose diameter is gradually increased in the upward direction is formed at the upper portion of the outer surface of the sleeve housing 525. Consequently, a tapering gap 523 whose width is gradually increased in the downward direction is formed between the slanting surface 5252 and the inner surface of the cylinder portion 352 of the hub portion 35a. A boundary surface of the lubricant is formed within the tapering gap 523.

The annular region 5253 of the sleeve housing 525 located below the slanting surface 5252 in a coaxial relationship with the central axis J1 and the slanting surface 3521 of the hub portion 35a located below the cylinder portion 352 are application regions on which the oil-repellent agent is to be applied. The remaining structures of this bearing mechanism are substantially the same as those of the bearing mechanism 5a shown in FIG. 11. The same components are designated by like reference numerals. Furthermore, the process of forming the oil-repellent film on the hub portion 35a is the same as that of forming the oil-repellent film on the rotor hub 35 illustrated in FIG. 4.

In the process of forming the oil-repellent film on the sleeve housing 525, a flowable oil-repellent agent is first applied on the annular region 5253 of the sleeve housing 525 (step S11). The sleeve housing 525 is arranged below and near the induction coil 92 of the heating device 9 shown in FIGS. 5 and 6 along the central axis J2 of the induction coil 92 (step S12). An AC current with a frequency of about 15 kHz is supplied from the AC circuit 91 to the induction coil 92. The sleeve housing 525 is inductively heated by the magnetic flux generated by the induction coil 92 (step S13), as a result of which the oil-repellent agent is cured to be affixed to the annular region 5253 of the sleeve housing 525. Use of the induction heating for forming the oil-repellent film on the sleeve housing 525 makes it possible to fix the oil-repellent agent within a short period of time.

Figure 17:
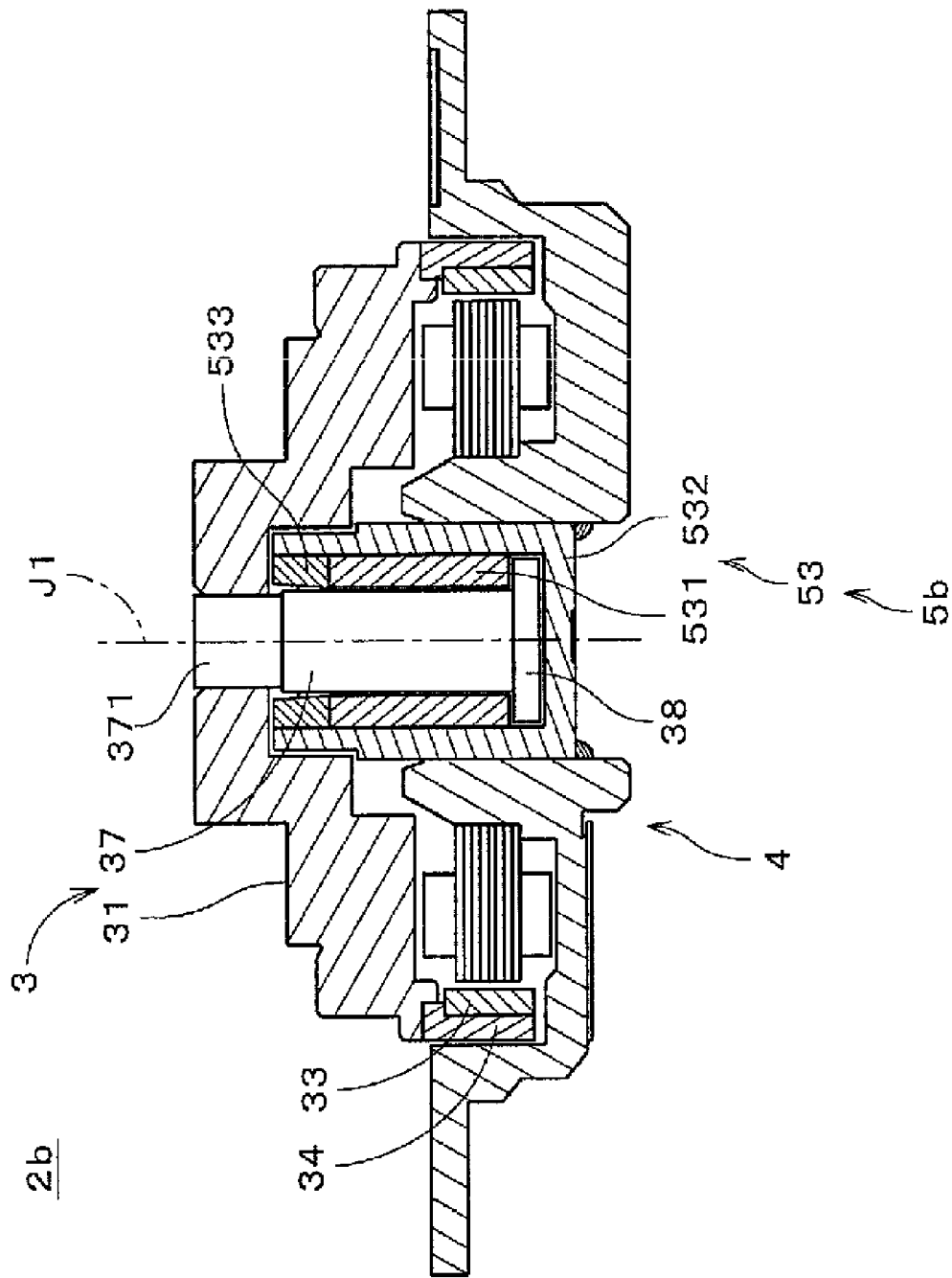
FIG. 17 is a sectional view showing a motor in accordance with a second modified example of the first embodiment.

FIG. 17 is a sectional view of a motor 2b in accordance with a second modified example of the first embodiment. As in the first embodiment, the motor 2b is the one employed in the storage disk drive apparatus. The motor 2b includes a sleeve portion 53 whose structure differs from the sleeve portion 51 of the motor 2 of the first embodiment. The remaining structures of the motor 2b are substantially the same as the motor 2 of the first embodiment. The rotor unit 3 is supported by a dynamic fluid pressure bearing mechanism 5b (hereinafter referred to as a "bearing mechanism 5b") in a manner rotatable with respect to the stator unit 4. In the following description, the shaft and the thrust plate will be designated by reference numerals 37 and 38, respectively, which differ from those used in FIG. 2.

The sleeve portion 53 includes a lubricant-impregnated porous sleeve 531; a substantially bottom-closed cylinder-shaped sleeve housing 532 that surrounds the outer and lower surfaces of the sleeve 531; and a substantially annular metal seal ring 533 that contacts the upper surface of the sleeve 531. In the rotor unit 3, the thrust plate 38 is attached to the lower portion of the shaft 37. The upper portion 371 of the shaft 37 is smaller in diameter than the remaining portion thereof.

Figure 18:
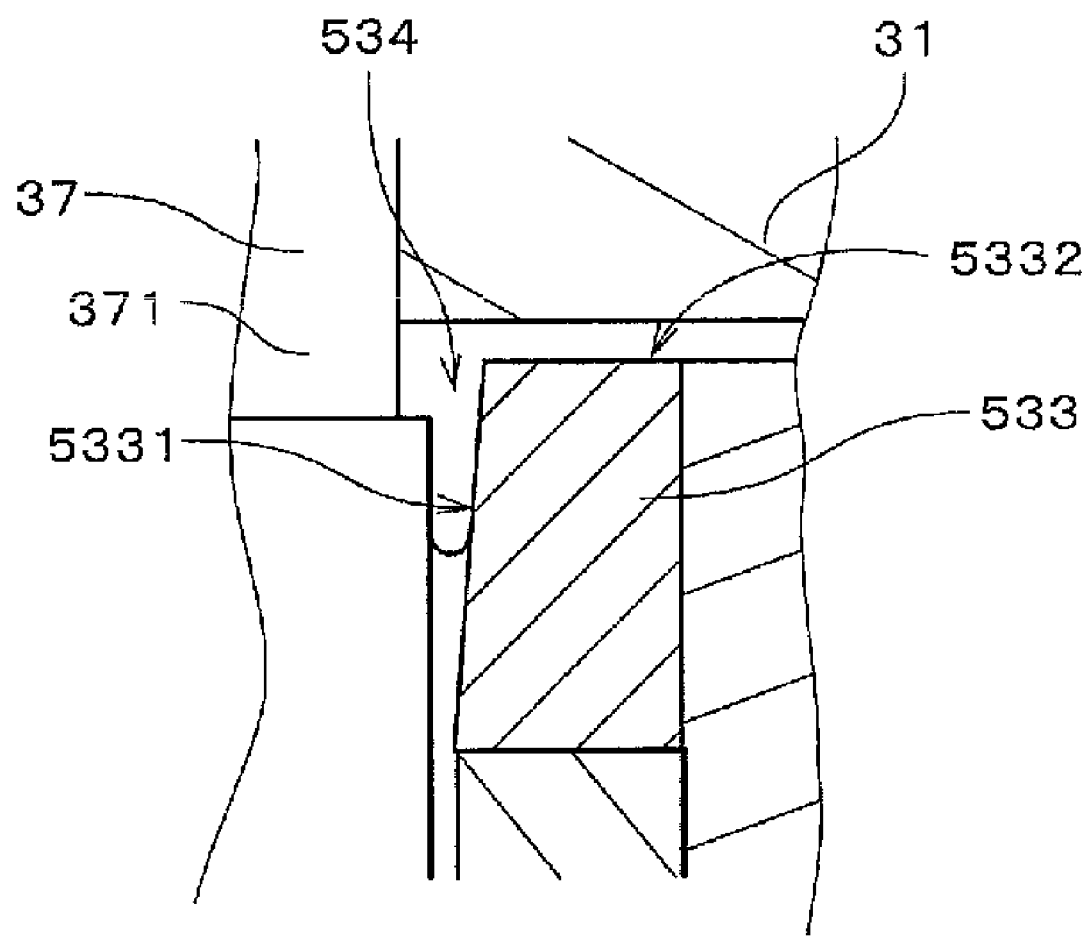
FIG. 18 is a view enlargedly showing the upper portion of the sleeve and its neighborhood.

In the motor 2b set forth above, the lubricant is held within the sleeve housing 532. The bearing mechanism 5b is constructed by the sleeve 531, the sleeve housing 532, the seal ring 533, the shaft 37, the thrust plate 38 and the lubricant present therebetween. As shown in FIG. 18, the seal ring 533 has an inner surface 5331 so inclined to have a diameter gradually increasing in the upward direction. A tapering gap 534 is formed between the inner surface 5331 of the seal ring 533 and the outer surface of the shaft 37. An oil-repellent agent is applied on the upper surface 5332 of the seal ring 533. Similarly, an oil-repellent agent is applied on the outer surface of the upper portion 371 of the shaft 37 below the region where the shaft 37 makes contact with the rotor hub 31. In the bearing mechanism 5b, leakage of the lubricant is prevented by the oil-repellent film and the tapering seal formed within the tapering gap 534.

Figure 4:
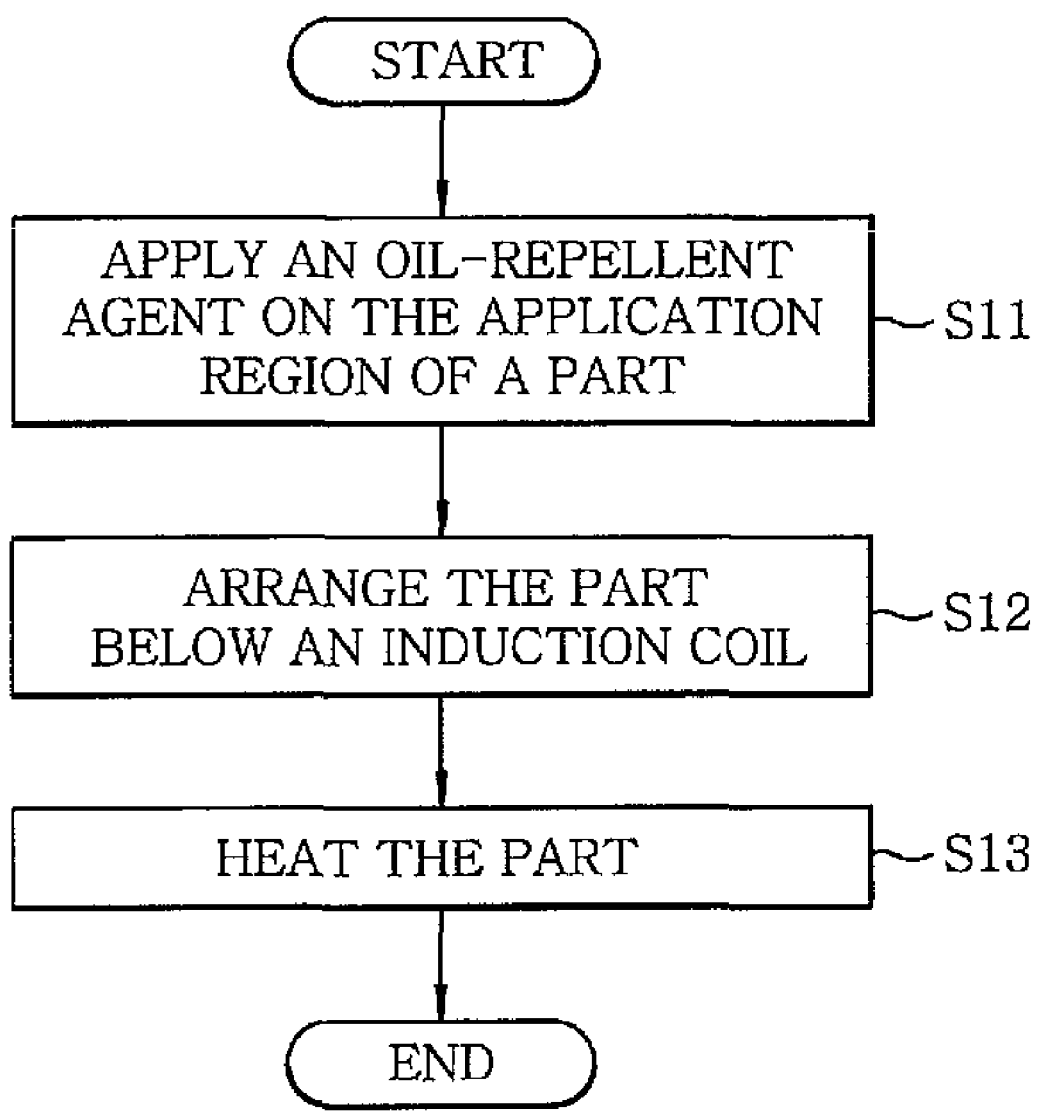
FIG. 4 is a flow chart illustrating a process through which an oil-repellent film is formed on a metal part.

The oil-repellent films are formed on the seal ring 533 and the shaft 37 according to the process shown in FIG. 4, as is the case in the first embodiment and the first modified example thereof. When forming the oil-repellent film on the seal ring 533, a flowable oil-repellent agent is first applied on the upper surface 5332 of the seal ring 533, which is an application region, throughout the entire circumference thereof (step S11). The seal ring 533 is arranged below and near the induction coil 92 (see FIG. 6) such that the upper surface 5332 is opposite to the induction coil 92 (step S12). Then, the seal ring 533 is inductively heated by the induction coil 92 (step S13), as a result of which the oil-repellent agent is cured to be affixed to the upper surface 5332 of the seal ring 533.

To form the oil-repellent film on the shaft 37, a flowable oil-repellent agent is applied on the lower region of the upper portion 371 of the shaft 37, which is an application region, throughout the entire circumference thereof (step S11). When the motor 2b is assembled, the application region is positioned slightly above the boundary surface of the lubricant formed within the tapering gap 534 as can be seen in FIG. 18. The oil-repellent agent may be so applied that it slightly extrudes into the region of the shaft 37 that is in contact with the rotor hub 31. Then, the shaft 37 is arranged below and near the induction coil 92, such that the upper portion 371 thereof is opposite to the induction coil 92, and is inductively heated by the induction coil 92 (steps S12 and S13). Consequently, the oil-repellent agent is cured to be affixed to the upper portion 371 of the shaft 37.

In the motor 2b, use of the induction heating of the induction coil 92 makes it possible to perform the task of fixing the oil-repellent agent to the seal ring 533 and the shaft 37 of the bearing mechanism 5b within a short period of time. The frequency of the AC current applied to the induction coil 92 is set to be lower than or equal to 100 kHz (and higher than or equal to 5 kHz for practical use). This helps to reduce a deformation in the shaft 37 and the seal ring 533 caused by heating.

Figure 19:
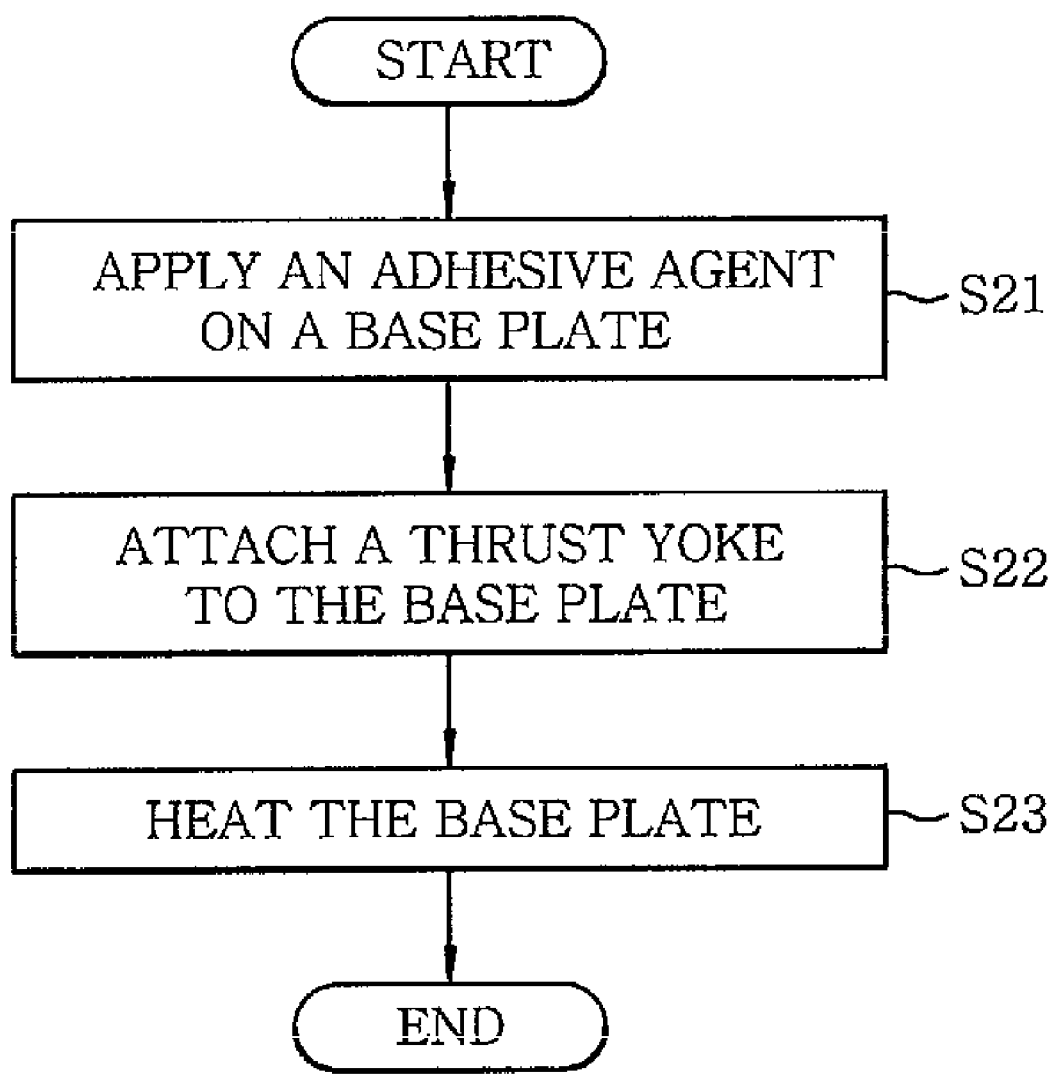
FIG. 19 is a flow chart illustrating a process of a second embodiment through which a base plate and a thrust yoke are bonded together.
Figure 20:
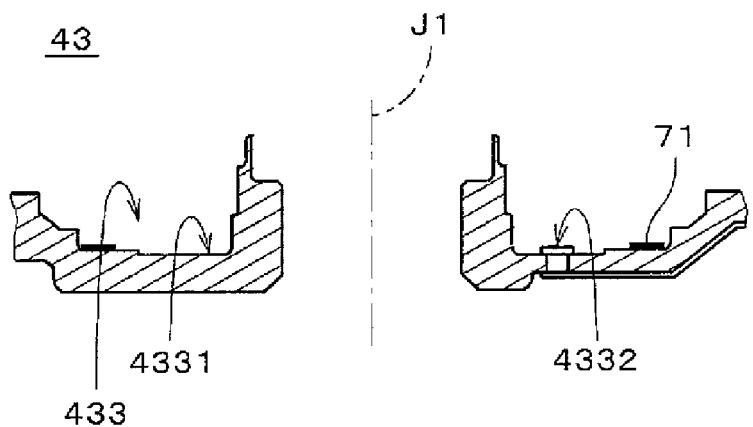
FIG. 20 is a sectional view showing the base plate.

Next, description will be made on the task of affixing the base plate 43 to the thrust yoke 44 in the motor 2a shown in FIG. 11 according to the second embodiment of the present invention. FIG. 19 is a flow chart illustrating the process through which the base plate 43 is affixed to the thrust yoke 44. FIG. 20 is a view partially showing the cross-section of the base plate 43 taken along a plane containing the central axis J1 of the motor 2a.

First, a thermally curable adhesive agent 71 is applied on the outer periphery of the bottom surface 4331 of the recess portion 433 in the base plate 43 (namely, on the annular region located radially outward of the through-hole 4332) (step S21). The adhesive agent 71 is of a single component capable of being cured rapidly, and is what is called as a completely epoxy-based adhesive agent that only includes an epoxy-based substance as an adhesive component. Use of the single-component adhesive agent helps to simplify the manufacturing process of the motor 2a as compared to a case where, e.g., a two-component adhesive agent is used. This results in reduction of the manufacturing cost of the motor 2a. Furthermore, use of the epoxy-based adhesive agent assists in reducing the outgassing of the adhesive agent 71.

Figure 21:
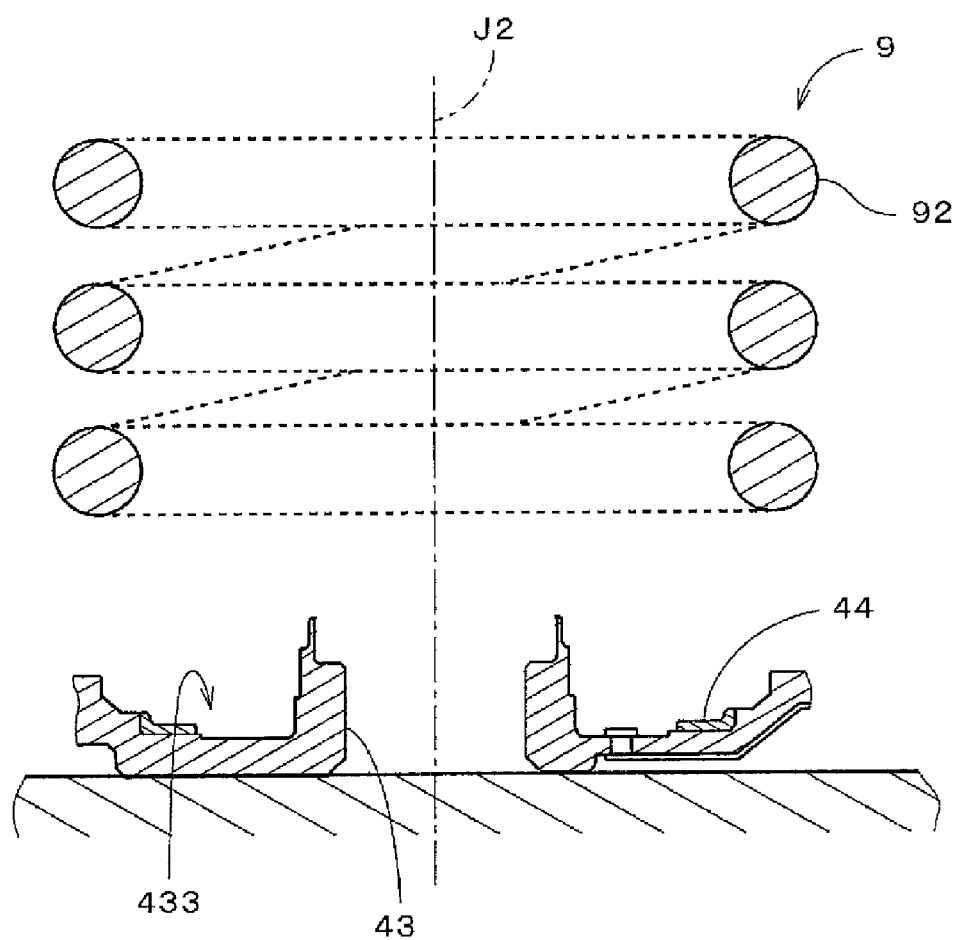
FIG. 21 is a view illustrating the placement of the base plate relative to the induction coil.

Next, the thrust yoke 44 is brought into contact with and attached to the outer periphery of the bottom surface 4331 of the base plate 43 with the adhesive agent 71 interposed therebetween (step S22). FIG. 21 is a sectional view illustrating the placement of the base plate 43 and the thrust yoke 44 relative to the induction coil 92 of the heating device 9. The heating device 9 is the same one as shown in FIGS. 5 and 6. The base plate 43 and the thrust yoke 44 are arranged below and near the induction coil 92 along the central axis J2 of the latter.

An AC current with a frequency of about 15 kHz is supplied from the AC circuit 91 (see FIG. 5) to the induction coil 92, thereby applying the induction heating to the recess portion 433 of the base plate 43 and its neighborhood (step S23). Thus, the adhesive agent 71 interposed between the base plate 43 and the thrust yoke 44 is indirectly heated to be cured. In this manner, the base plate 43 and the thrust yoke 44 are affixed together.

Figure 22:
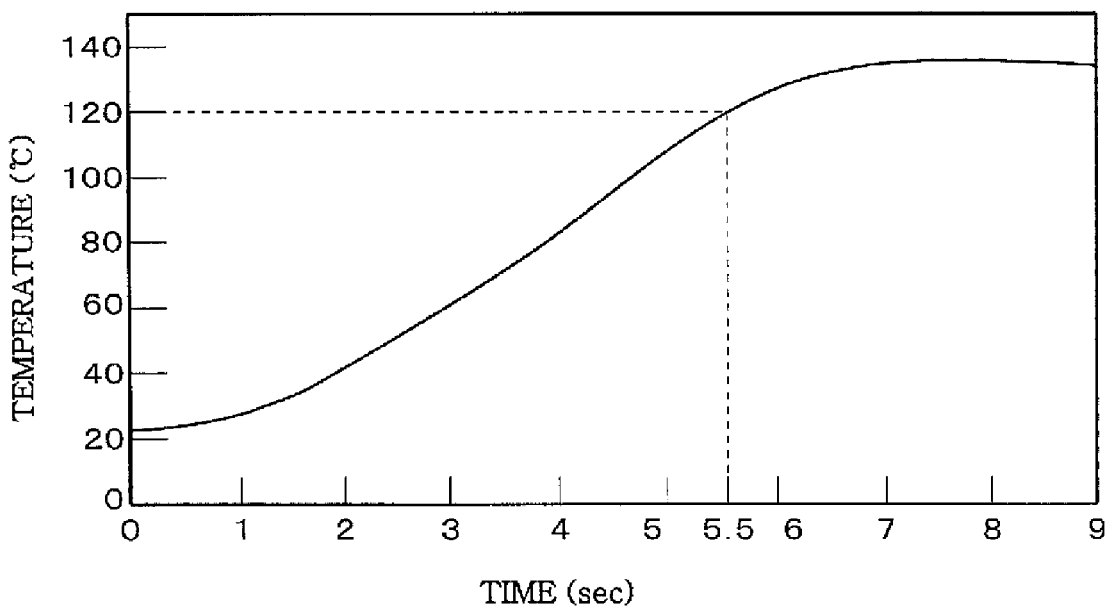
FIG. 22 is a view representing the temperature change of the base plate generated by induction heating.

FIG. 22 is a view representing the temperature change of the base plate 43 caused by the induction heating. It can be seen that the temperature is elevated within 5.5 seconds from about 20° C. available before heating to 120° C. at which the adhesive agent 71 is fully cured. Use of the induction heating of the induction coil 92 for affixing the base plate 43 to the thrust yoke 44 makes it possible to perform the task of affixing the base plate 43 and the thrust yoke 44 within a short period of time.

When applying the induction heating to the base plate 43, an AC current having a frequency within a range from about 5 to about 100 kHz may be used instead of 15 kHz. Further, it is more preferably to set the frequency within a range from 5 to 20 kHz. Since the heating device 9 performs the induction heating, it is possible to avoid a steep temperature variation between the surface region and the interior region of the base plate 43. This helps to reduce a thermal deformation in the base plate 43. Furthermore, as set forth earlier, an AC current generating circuit can be constructed with a simple structure by using the transistors 9121 through 9124 (see FIG. 8) in the heating device 9. This makes it possible to produce the AC circuit 91 in a cost-effective manner.

In the above, the frequency of the AC current is set to be lower than or equal to about 100 kHz, because the IGBTs employed as the transistors 9121 to 9124 in the AC current generation unit 912 can operate at frequencies lower than or equal to about 100 kHz, and, if the frequency is higher than about 100 kHz, FETs or the like should be used instead of the IGBTs, thereby increasing the production costs.

Further, the frequency of the AC current is set to be higher than or equal to about 5 kHz, because the amount of time required for heating becomes impractically large at frequencies below about 5 kHz. More specifically, the temperature at which the solvent in the oil-repellent agent is volatilized, and the temperature at which the thermally curable adhesive agent is cured, and the temperature required for the preheating are all about 120° C.

In case of, e.g., a spindle motor used for a 2.5 inch hard disk drive (HDD), it takes about 5.5 seconds to increase a temperature of the shaft 32 or the sleeve 511 from about 20° C. to about 120° C. by the induction heating at the AC current frequency of about 15 kHz. Further, in the above case, it takes about 18 seconds to increase the temperature as above at about 5 kHz, and longer time at frequencies therebelow. Therefore, considering that the line tact time should be shorter than about 20 seconds, it is impractical to set the AC current frequency to be lower than about 5 kHz.

Further, it is preferable to set the frequency of the AC current to be lower than or equal to about 20 kHz, because the temperature that can cause a thermal deformation such as a distortion in the base plate 34 becomes impractically low at frequencies above about 20 kHz.

Figure 34:
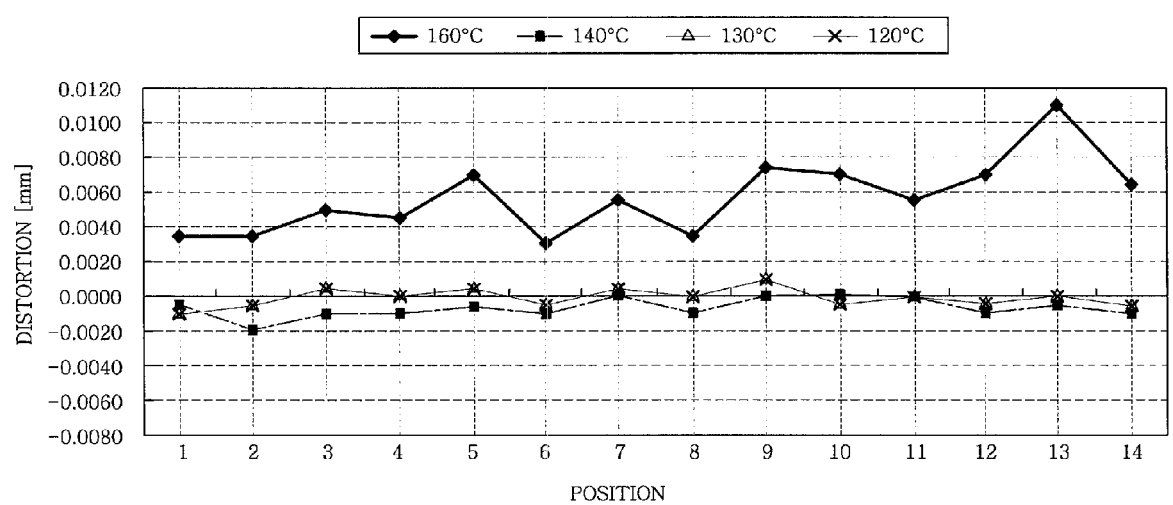
FIG. 34 is a graph showing distortions measured at positions 1 to 14 in a base plate respectively at different temperatures.

FIG. 34 presents a graph that shows distortion amounts measured at various positions (i.e., positions 1 to 14) on a base plate of a motor for driving a 2.5 inch HDD, in case of induction-heating the base plate to 120° C., 130° C., 140° C. and 160° C., respectively. Therein, the vertical axis represents the distortion amount, and the horizontal axis represents the position at which the distortion amount is measured. As shown in the graph of FIG. 34, in case of the AC current frequency of 15 kHz, the distortion in the base plate 34 is negligible at 140° C., and arises to a considerable degree at 160° C. However, at the AC current frequency of about 20 kHz or higher, the distortion in the base plate 34 arises at a lower temperature so that the base plate 34 may be thermally deformed at about 120° C., which is a target temperature to be reached by the heating. To avoid such problems, it is preferable to set the AC current frequency to be about 20 kHz or lower.

As discussed above, the amount of time required for heating is increased if the AC current frequency is lowered, and the thermal deformation may occur if the AC current frequency is raised. Considering these factors comprehensively, it is most preferable to set the frequency of the AC current to be about 15 kHz.

Figure 23:
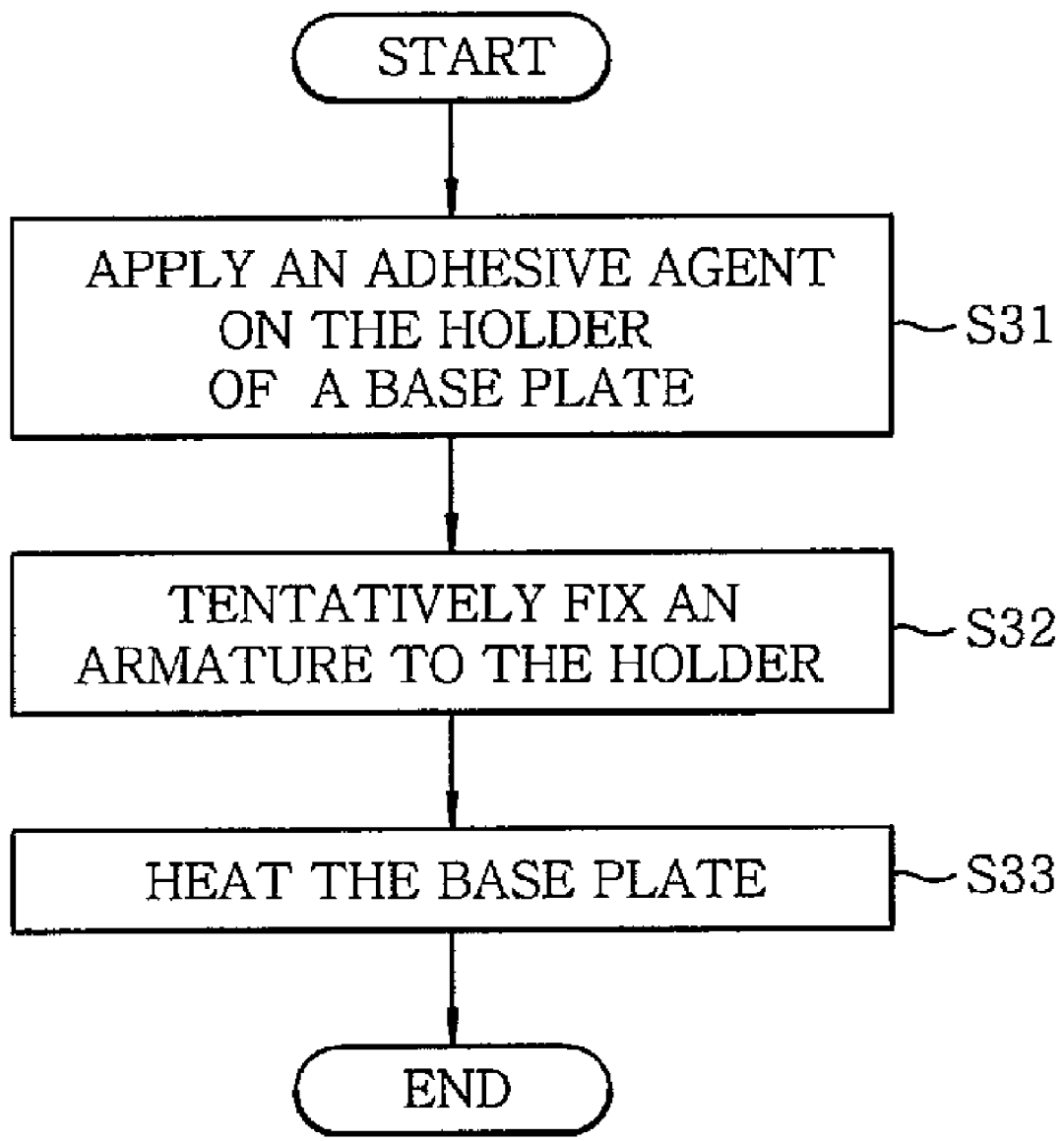
FIG. 23 is a flow chart illustrating a process of a first modified example of the second embodiment through which a base plate and an armature are bonded together.
Figure 24:
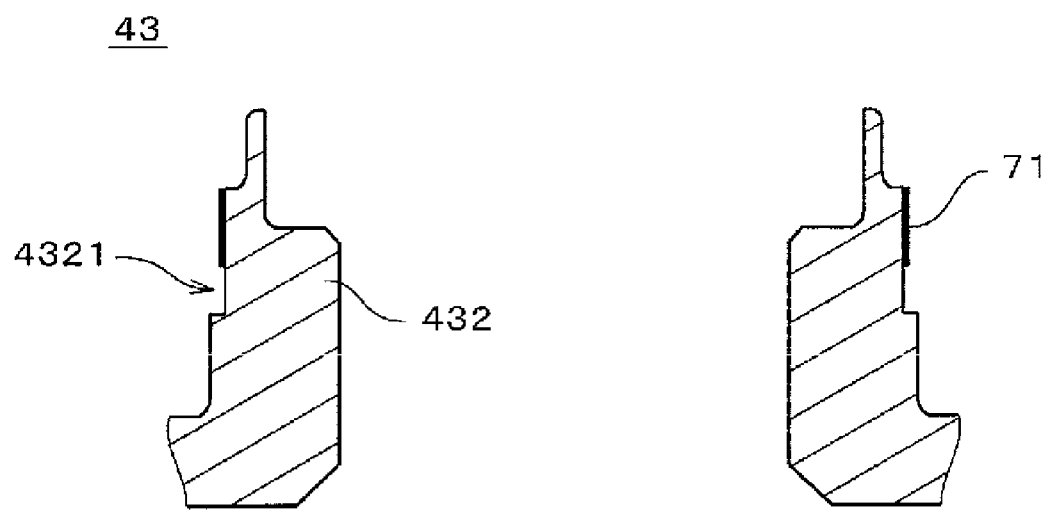
FIG. 24 is a sectional view showing a holder of the base plate.

Next, description will be made on the task of affixing the base plate 43 to the stator 42 in the motor 2a shown in FIG. 11 according to the first modified example of the second embodiment. FIG. 23 is a flow chart illustrating the process through which the base plate 43 and the stator 42 are affixed together. FIG. 24 is a sectional view enlargedly showing the holder 432 of the base plate 43. In the task of affixing the base plate 43 to the stator 42, a thermally curable adhesive agent 71 is first applied on the stator attachment region 4321 of the outer surface of the holder 432 throughout the entire circumference thereof (step S31). As in the second embodiment, the adhesive agent 71 is a single-component adhesive agent capable of being cured rapidly, and contains only an epoxy-based substance as an adhesive component.

Figure 25:
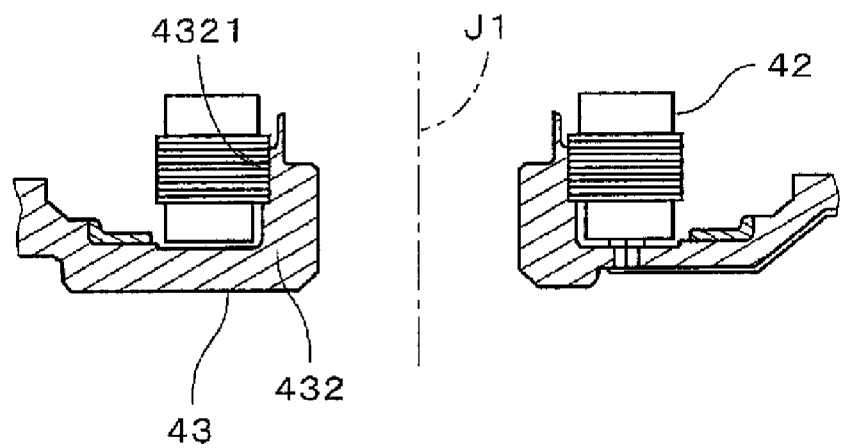
FIG. 25 is a sectional view showing a stator unit of a motor.

Then, the stator 42 is arranged above the base plate 43 to be opposite the holder 432. As shown in FIG. 25, the holder 432 is fitted to the stator 42 substantially in parallel to the central axis J1. At this time, the stator 42 has an inner diameter slightly smaller than that of the stator attachment region 4321. The stator 42 is tentatively fixed to the base plate 43 by press-fitting (step S32). The adhesive agent 71 shown in FIG. 24 is extended and spread between the stator 42 and the stator attachment region 4321. That is to say, the stator 42 is brought into contact with the base plate 43 with the adhesive agent 71 interposed therebetween.

Figure 26:
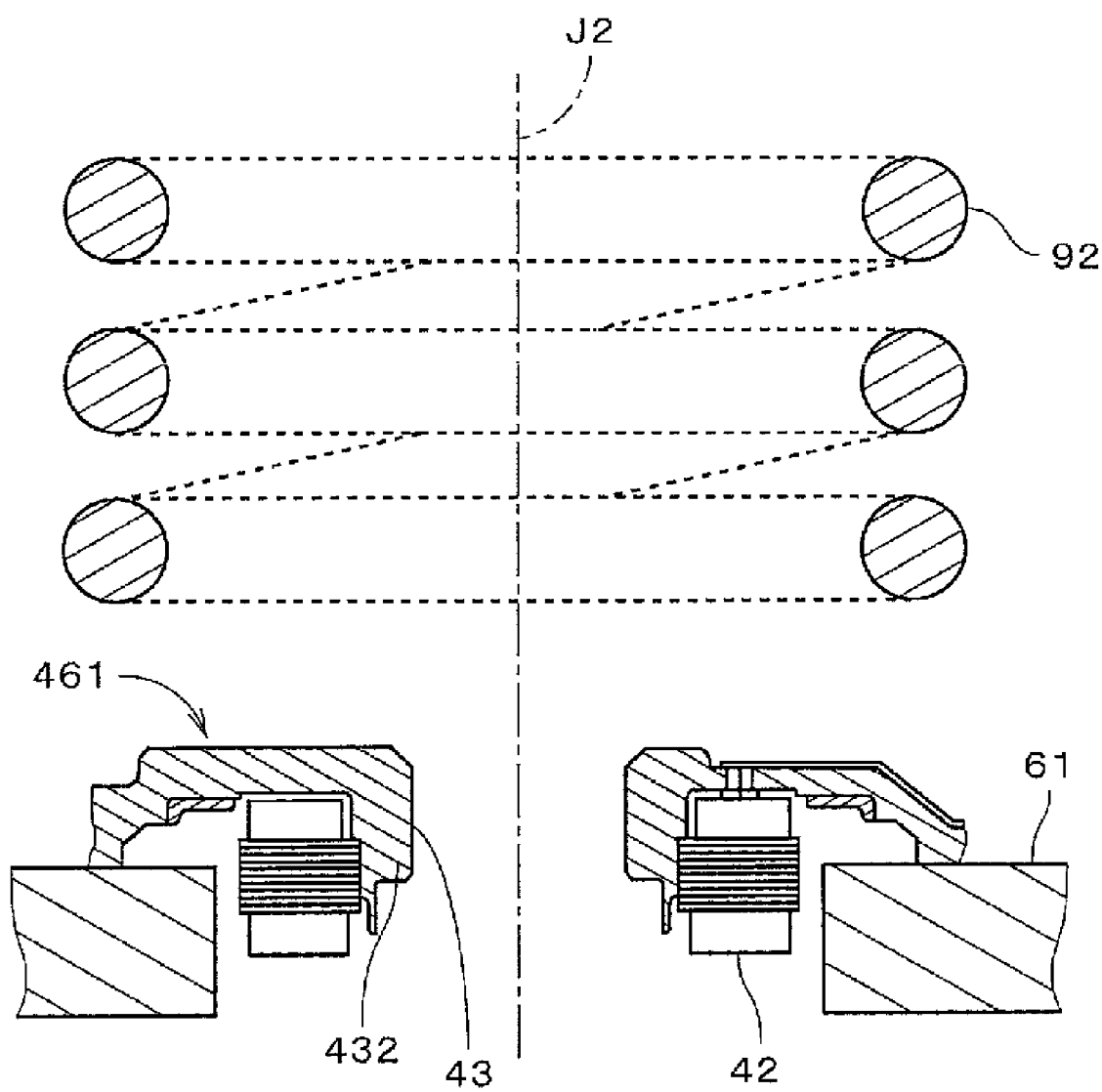
FIG. 26 is a view illustrating the placement of the stator unit relative to the induction coil.

Thereafter, as shown in FIG. 26, the base plate 43 and the stator 42 are held on the holder portion 61 in a state that the stator 42 faces downwards such that the stator 42 and the holder 432 of the base plate 43 are arranged inside the opening of the holder portion 61. Consequently, the base plate 43 and the stator 42 are arranged below the induction coil 92 along the central axis J2 of the latter. An AC current with a frequency of about 15 kHz is supplied from the AC circuit 91 (see FIG. 5) to the induction coil 92, thereby applying the induction heating to the holder 432 of the base plate 43 and the neighborhood of the holder 432 (step S33). As a result, the adhesive agent 71 interposed between the base plate 43 and the stator 42 (see FIG. 24) is indirectly heated to be cured, affixing the base plate 43 to the stator 42.

Use of the induction heating by the induction coil 92 for affixing the base plate 43 to the stator 42 as described above makes it possible to perform the task of affixing the base plate 43 and the stator 42 within a short period of time. In the heating device 9, it is possible to avoid a steep temperature variation between the surface region and the interior region of the base plate 43. This helps to reduce a thermal deformation of the base plate 43 caused by heating. When applying the induction heating to the base plate 43, an AC current having a frequency within a range from about 5 to about 100 kHz may be used instead of the AC current with a frequency of about 15 kHz as is the case in the second embodiment. Further, it is more preferable that the frequency is set within a range of about 5 to 20 kHz (this holds true also in case of the second and third modified examples of the second embodiment).

Figure 27:
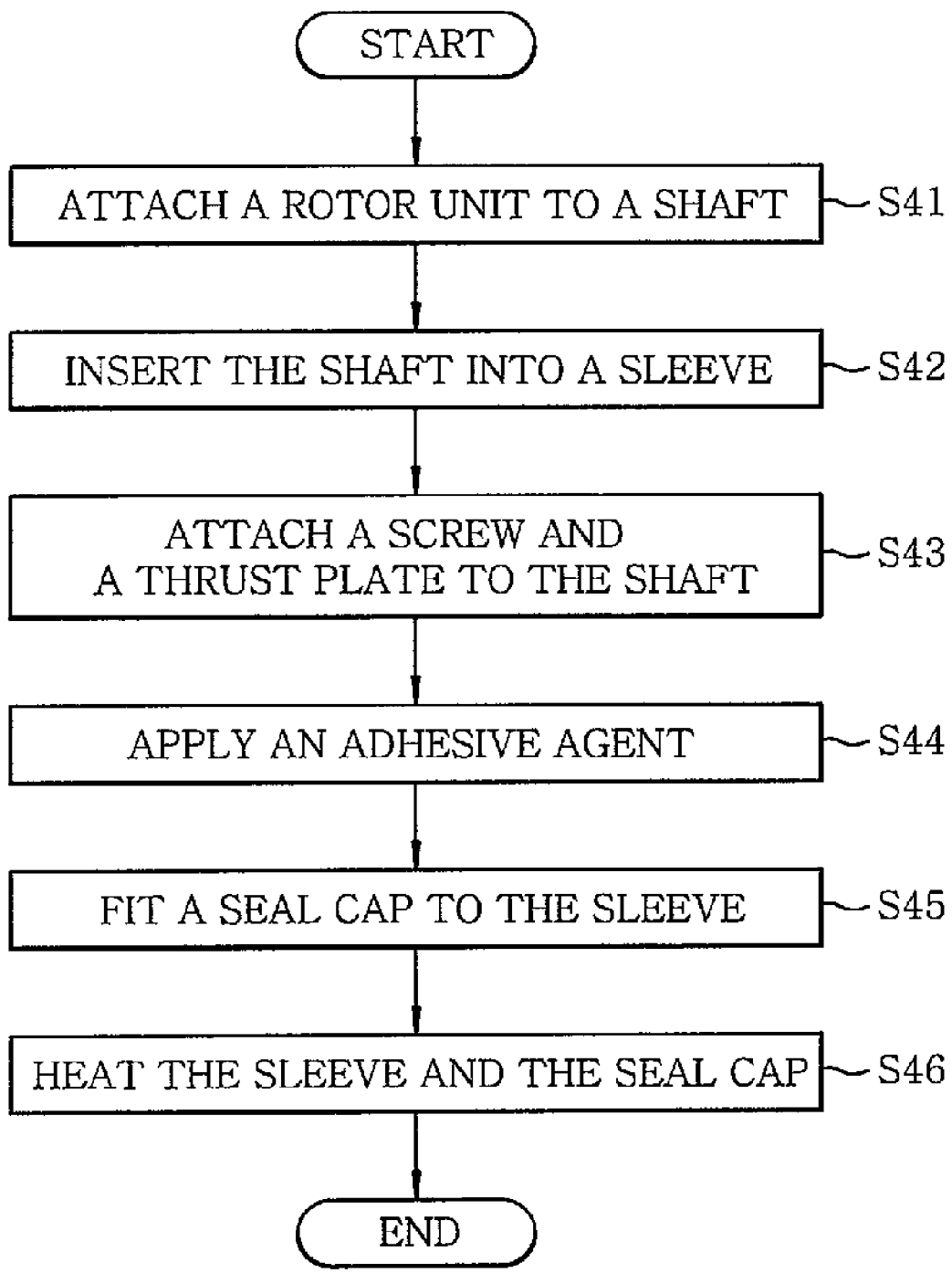
FIG. 27 is a flow chart illustrating a process of a second modified example of the second embodiment through which a sleeve and a seal cap are affixed together.

With reference to FIG. 27, description will be made on the task of affixing the sleeve 521 to the seal cap 522 in the motor 2*a* shown in FIG. 11 according to the second modified example of the second embodiment. In a process performed prior to affixing the seal cap 522 to the sleeve 521, the shaft 36 is first attached to the rotor hub 35 and is then inserted into the sleeve 521, after which the screw 361 and the thrust plate 362 are secured to the upper and lower openings of the shaft 36 (see FIG. 11) (steps S41 through S43). Consequently, the shaft 36, the rotor hub 35, the screw 361, the thrust plate 362 and the sleeve 521 constitute a single assembly.

Figure 28:
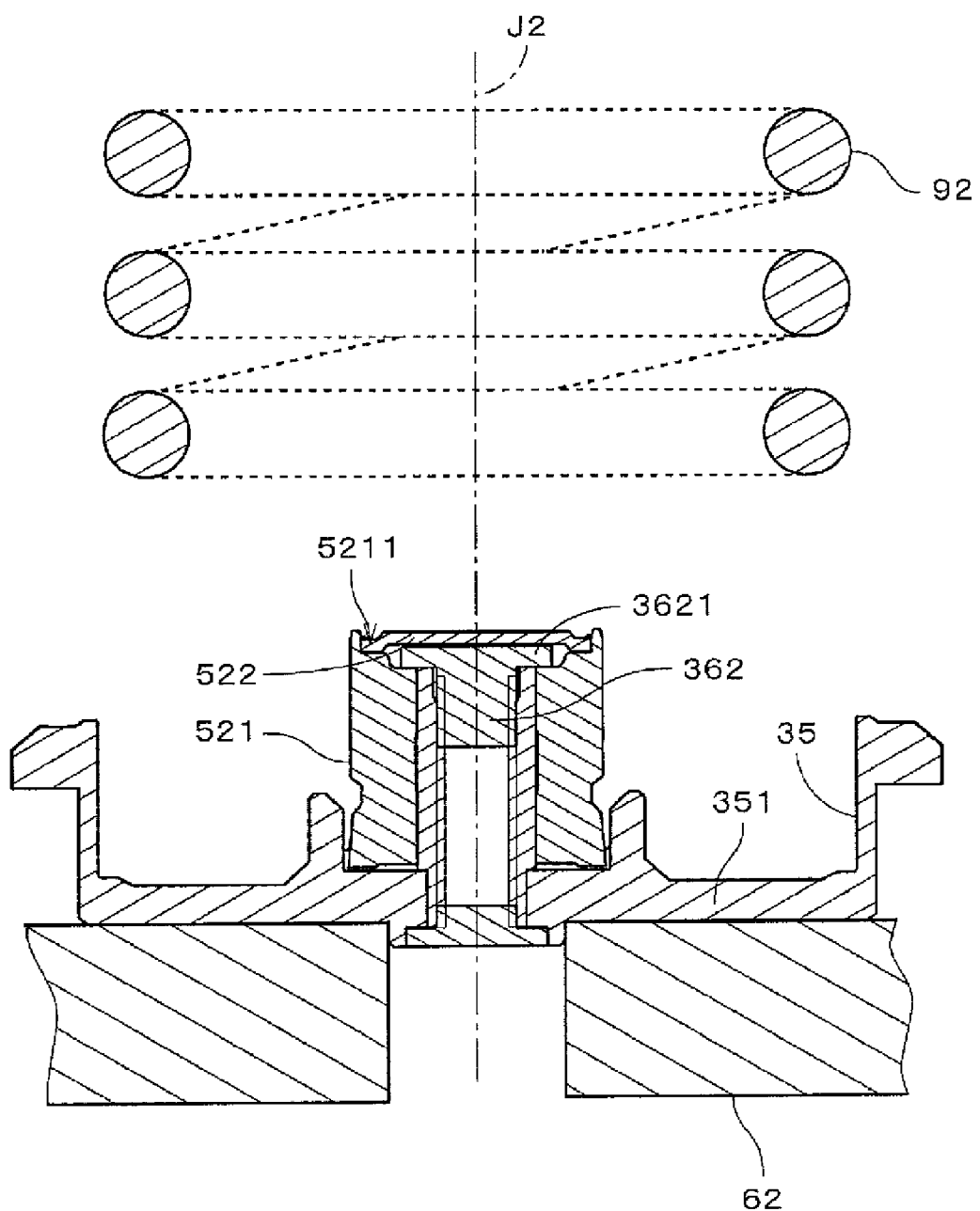
FIG. 28 is a view illustrating the placement of a rotor unit and a bearing mechanism relative to an induction coil.

Referring to FIG. 28, the rotor hub 35 is mounted on the holder portion 62 so that the upper surface of the disk-like portion 351 thereof faces downward. Thus, the disk-like portion 3621 of the thrust plate 362 faces upward relative to the direction of gravity. Then, a thermally curable adhesive agent is applied on the step portion 5211 of the sleeve 521 located radially outwardly of the disk-like portion 3621 (namely, on the outer one of the two step portions 5211 and 5212 shown in FIG. 12) throughout the entire circumference thereof (step S44). As the seal cap 522 is coupled together, the peripheral edge portion 5221 of the seal cap 522 makes contact with the step portion 5211 of the sleeve 521 via the adhesive agent as shown in FIG. 12 (step S45). At this time, the adhesive agent 71 is not extruded into the gap between the portion of the seal cap 522 located inwardly of the peripheral edge portion 5221 and the inner step portion 5212.

Thereafter, as shown in FIG. 28, the assembly inclusive of the seal cap 522 is arranged near the induction coil 92 along the central axis J2 of the latter. An AC current with a frequency of about 15 kHz is supplied from the AC circuit 91 (see FIG. 5) to the induction coil 92, thereby applying the induction heating to the seal cap 522 and the sleeve 521 (step S46). Consequently, the adhesive agent existing between the seal cap 522 and the sleeve 521 is indirectly heated to be cured, affixing the seal cap 522 to the sleeve 521. As in the second embodiment, use of the induction heating in the second modified example of the second embodiment also enables to perform the task of affixing the seal cap 522 to the sleeve 521 within a short period of time.

Next, description will be made on the task of affixing the sleeve housing 525 shown in FIG. 16 to the seal cap 522 according to a variant of the second modified example of the second embodiment. The process of affixing the sleeve housing 525 to the seal cap 522 is substantially the same as that of affixing the sleeve 521 to the seal cap 522 shown in FIG. 11. The hub portion 35*a*, the screw 361, the thrust plate 362, the sleeve 524 and the sleeve housing 525 are preliminarily combined into a single assembly. As shown in FIG. 28, the disk-like portion 3621 of the thrust plate 362 is placed in such a state as to face upward relative to the direction of gravity. Then, a thermally curable adhesive agent is applied on the step portion 5251 (see FIG. 16) of the sleeve housing 525 located radially outwardly of the disk-like portion 3621 throughout the entire circumference thereof. The peripheral edge portion of the seal cap 522 makes contact with the step portion 5251 of the sleeve housing 525 via the adhesive agent.

Thereafter, the assembly inclusive of the seal cap 522 is arranged near the induction coil 92. An AC current with a frequency of about 15 kHz is supplied to the induction coil 92 to thereby inductively heat the seal cap 522 and the sleeve housing 525. Consequently, the adhesive agent 71 existing between the seal cap 522 and the sleeve housing 525 is indirectly heated to be cured, affixing the seal cap 522 to the sleeve housing 525. Use of the induction heating makes it possible to perform the task of affixing the seal cap 522 to the sleeve housing 525 within a short period of time.

Figure 29:
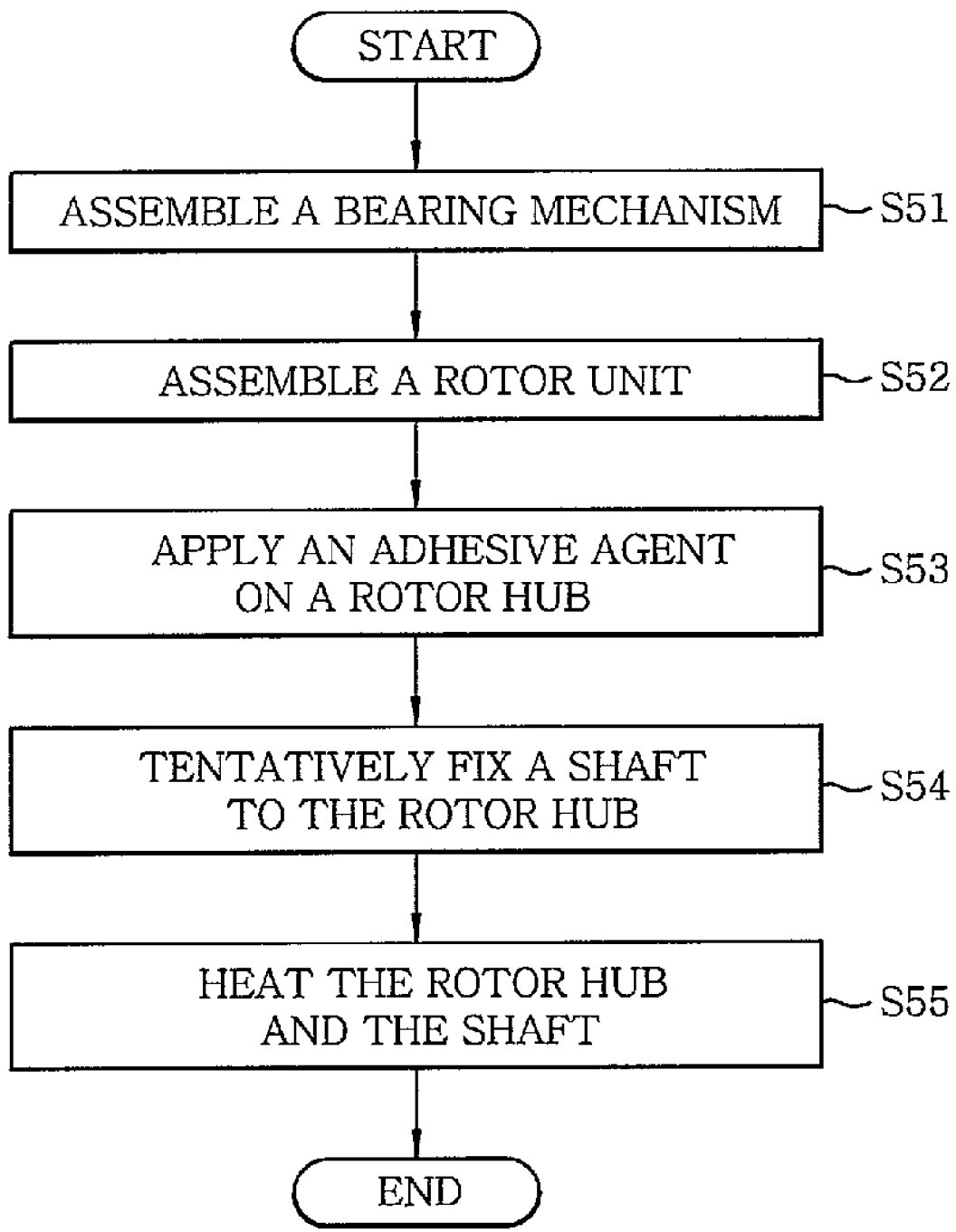
FIG. 29 is a flow chart illustrating a process of a third modified example of the second embodiment through which a rotor hub and a shaft are affixed together.

With reference to FIG. 29, description will be made on the task of affixing the rotor hub 31 to the shaft 37 in the motor 2*b* shown in FIG. 17 according to the third modified example of the second embodiment. In a process performed prior to affixing the shaft 37 to the rotor hub 31, the shaft 37 and the thrust plate 38 are first inserted into the sleeve housing 532. The lubricant-impregnated sleeve 531 and the seal ring 533 are inserted between the sleeve housing 532 and the shaft 37, thereby forming the bearing mechanism 5*b*. On the other hand, the yoke 34 is fixed to the rotor hub 31, and the rotor magnet 33 is attached to the inside of the yoke 34 to thereby fabricate the rotor unit 3 (see FIG. 17) (steps S51 and S52).

Figure 30:
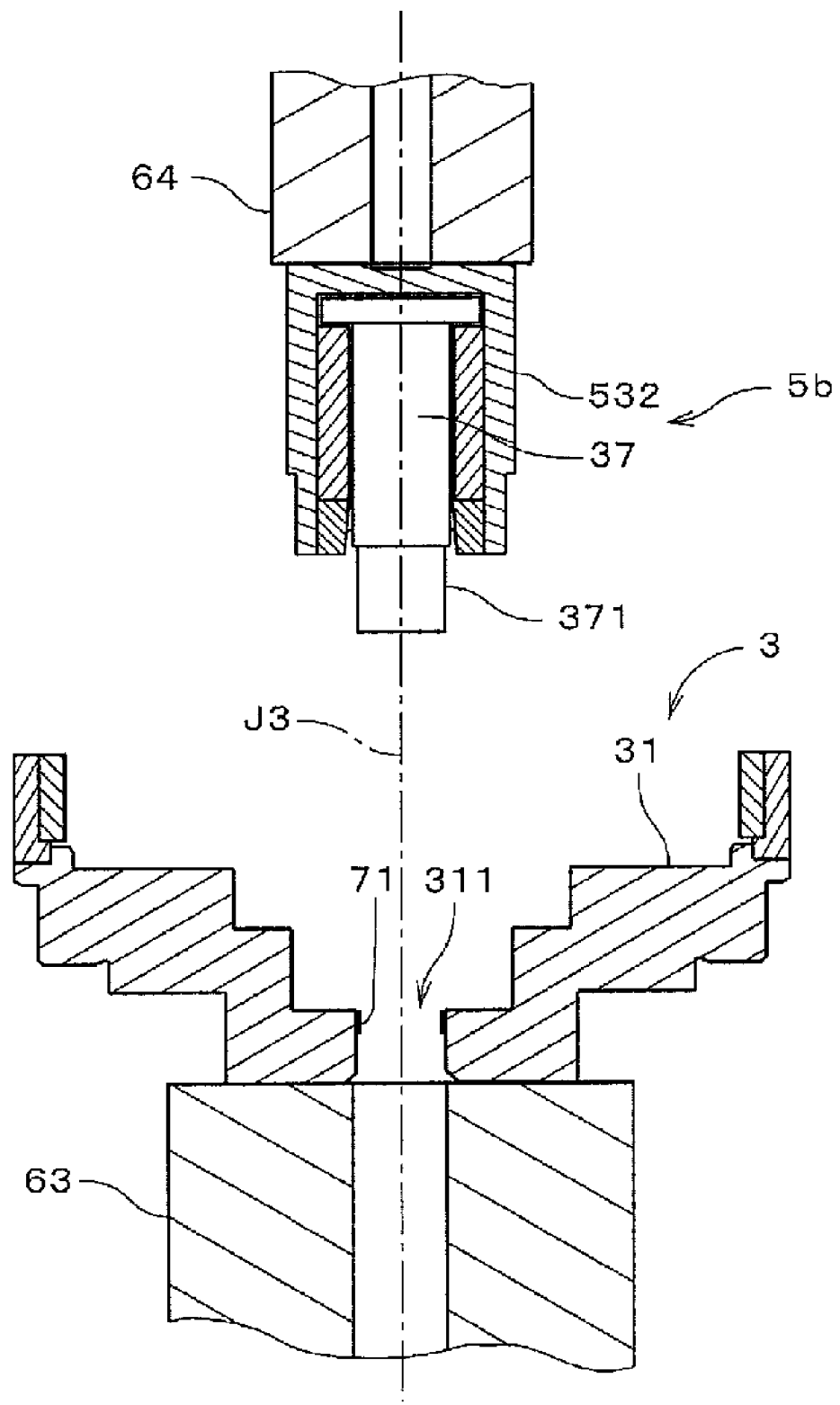
FIG. 30 is a view showing how to affix a rotor unit and a bearing mechanism together.

Next, as shown in FIG. 30, the rotor unit 3 is held on the holder portion 63, and an adhesive agent 71 is applied on the inner surface of the central opening 311 of the rotor hub 31 (step S53). The sleeve housing 532 of the bearing mechanism 5*b* is attached to the holder portion 64 such that the lower surface (the upper surface in FIG. 30) of the bottom portion thereof makes contact with the tip end of the holder portion 64. Thus, the bearing mechanism 5*b* is so oriented that the upper portion 371 of the shaft 37 faces downward. At this time, the rotor unit 3 and the bearing mechanism 5*b* are positioned such that the central axes thereof are coaxial with a specified central axis J3.

Then, the bearing mechanism 5*b* is moved down along the central axis J3 until the upper portion 371 of the shaft 37 is inserted into the opening 311 of the rotor hub 31. Since the opening 311 of the rotor hub 31 has an inner diameter slightly smaller than that of the upper portion 371 of the shaft 37, the bearing mechanism 5*b* is tentatively fixed to the rotor unit 3 as the shaft 37 and the rotor hub 31 come into contact with each other (step S54). The adhesive agent 71 applied on a neighboring area of the opening 311 is expanded such that it becomes interposed between the rotor hub 31 and the shaft 37. When tentatively fixing the shaft 37 to the rotor hub 31, the rotor unit 3 may be moved up along the central axis J3, and the rotor unit 3 and the bearing mechanism 5*b* may be assembled together in a vertically inverted state.

Figure 31:
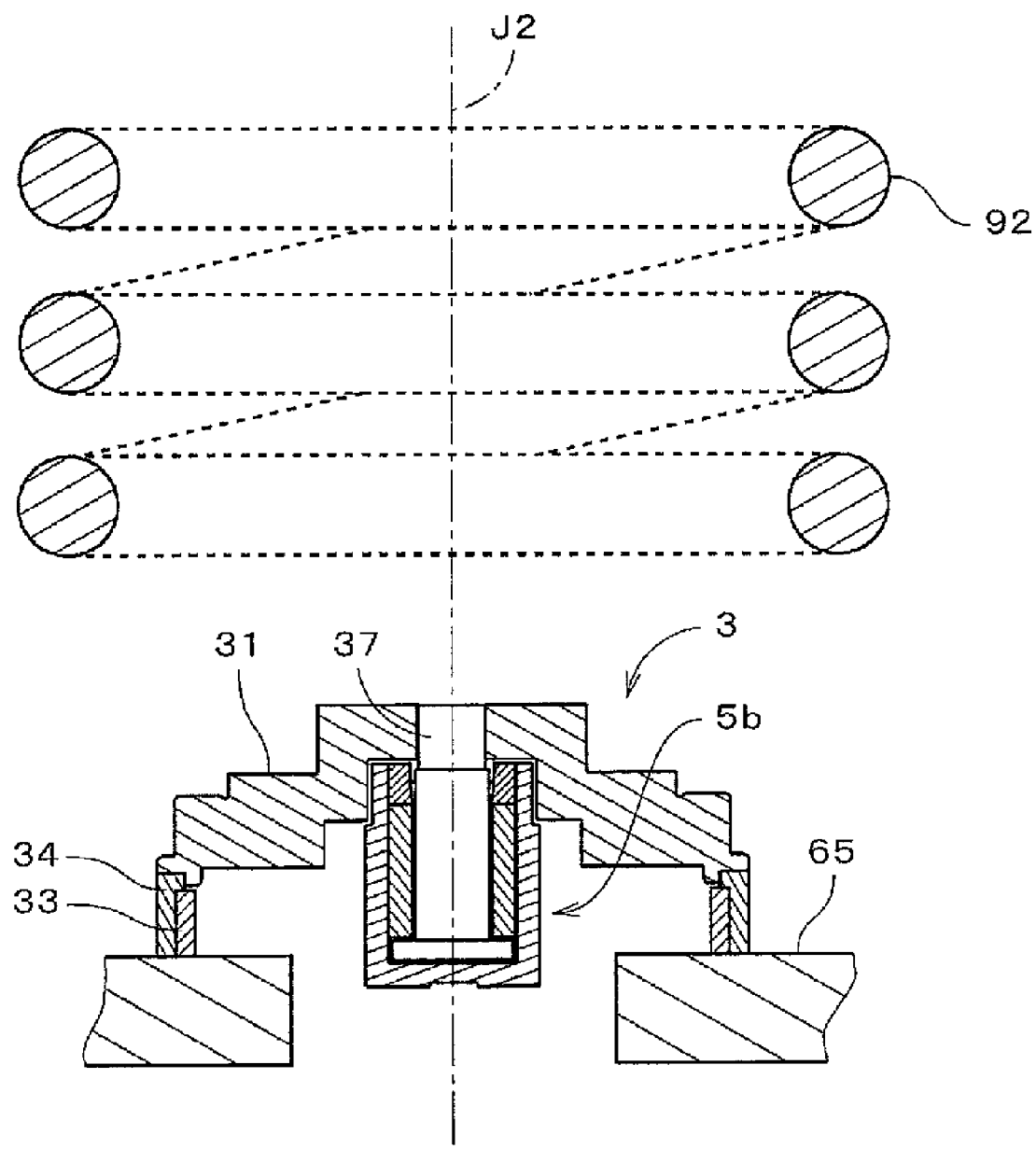
FIG. 31 is a view illustrating the placement of the rotor unit and the bearing mechanism relative to the induction coil.

Thereafter, the rotor unit 3 and the bearing mechanism 5*b* are separated from the holder portions 63 and 64. The rotor unit 3 and the bearing mechanism 5*b* thus united together are vertically inverted as shown in FIG. 31, in which state the rotor magnet 33 and the yoke 34 of the rotor unit 3 are held on the holder portion 65. Consequently, the rotor unit 3 and the bearing mechanism 5*b* are arranged below and near the induction coil 92 along the central axis J2, after which the rotor hub 31 and the shaft 37 are inductively heated (step S55). As a result, the adhesive agent 71 (see FIG. 30) is indirectly heated to be cured, affixing the rotor hub 31 to the shaft 37. Use of the induction heating for affixing the rotor hub 31 to the shaft 37 as above makes it possible to perform the affixing task within a short period of time.

Figure 32:
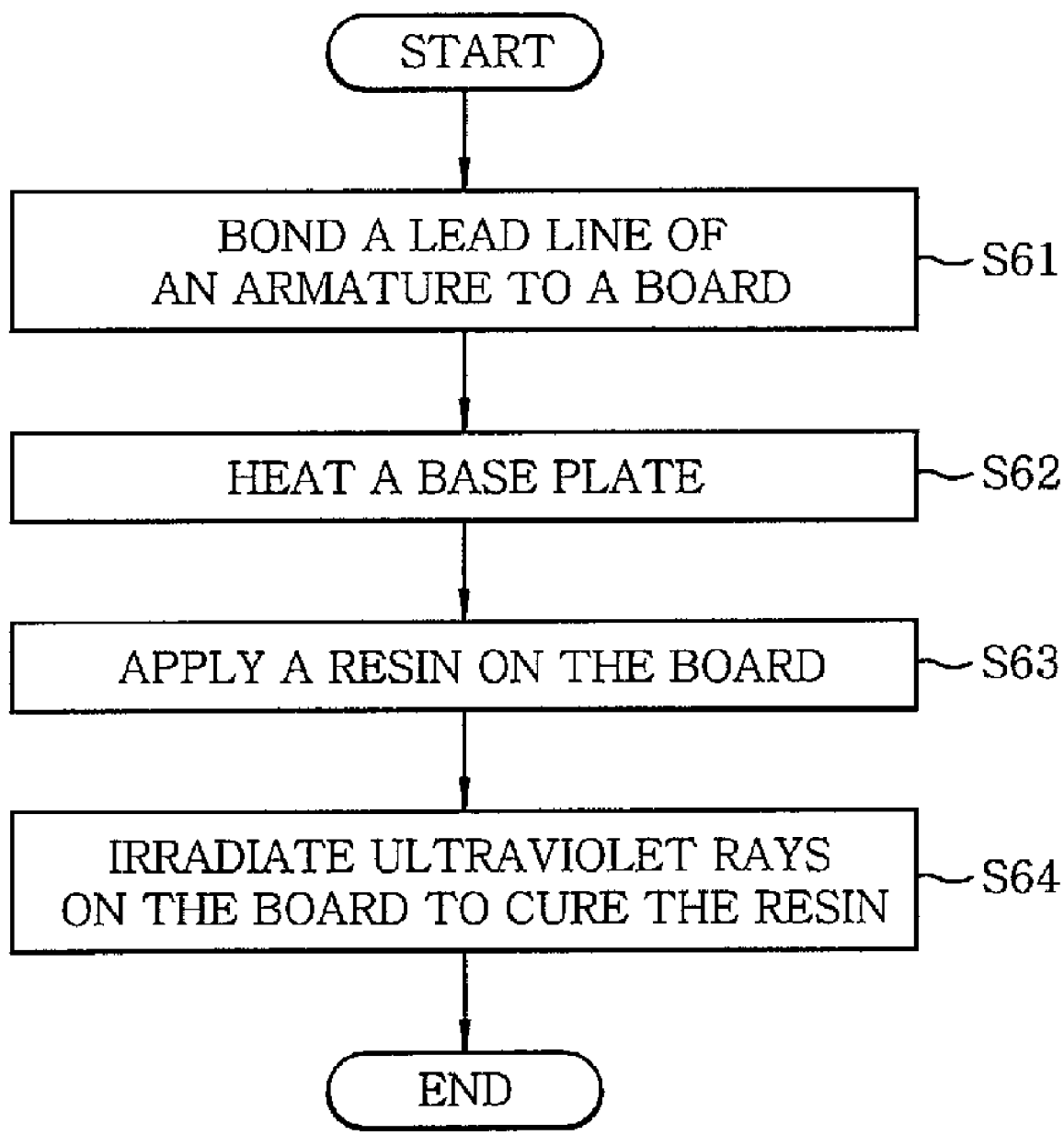
FIG. 32 is a flow chart illustrating a process of a third embodiment through which the affixing portion of a circuit board is sealed.

With reference to FIG. 32, description will be made on the task of sealing with a resin the affixing portion 81 of the board 8 attached to the base plate 43 in the motor 2a shown in FIG. 11 according to the third embodiment. Prior to performing the sealing task, the lead lines of the stator 42 fixed to the holder 432 of the base plate 43 are led via the bush 45 inserted into the through-hole 4332, and are bonded to the board 8 disposed in the board attachment region 4611 in the rear surface 461 (the surface facing away from the stator 42) of the base plate 43 (see FIG. 1) (step S61).

Then, as shown in FIG. 26, the base plate 43 and the stator 42 are held in place in a state that the stator 42 faces downward, so that the stator 42 and the holder 432 of the base plate 43 is located in the opening of the holder portion 61. The induction coil 92 is arranged above and near the rear surface 461 (the upwardly facing surface in FIG. 26) of the base plate 43.

Figure 33:
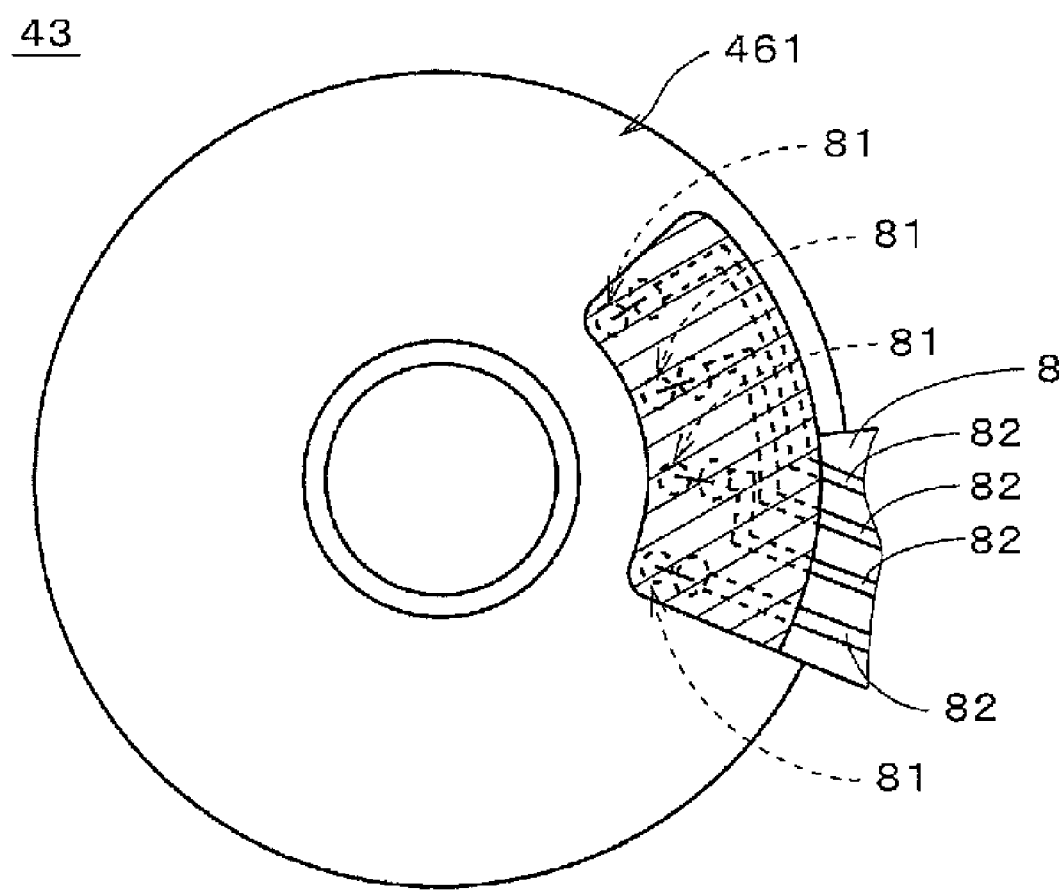
FIG. 33 is a view showing the rear surface of a base plate.

An AC current with a frequency of about 15 kHz is supplied from the AC circuit 91 (see FIG. 5) to the induction coil 92, thereby applying a preliminary induction heating the base plate 43 (step S62). The board 8 is also indirectly heated in this process. Immediately after heating the base plate 43, the induction coil 92 is moved away from the base plate 43. As shown in FIG. 33, a flowable ultraviolet-curable resin material 72 (see FIG. 11) is applied on the hatched region of the board 8 (on the surface of the board 8 faces away from the surface making contact with the base plate 43) (step S63). As a result, the bonding portion 81 of the board 8 and (a part of) the wiring lines 82 extending from the bonding portion 81 are covered with the resin material 72. FIG. 33 shows only a part of the rear surface 461 of the base plate 43 located below the rotor unit 3a shown in FIG. 11. The flowability of the resin material 72 applied on the board 8 is increased by preheating the base plate 43. The makes it possible to rapidly spread the resin material 72 on the board 8.

Thereafter, ultraviolet rays are irradiated on the board 8 to cure the resin material 72 (step S64), thereby sealing up the bonding portion 81 and the wiring lines 82 of the board 8. Use of the induction heating for sealing the board 8 with a resin as above makes it possible to preheat the base plate 43 within a short period of time. Since the induction coil 92 is kept out of contact with the base plate 43 (and the board 8), generation of metallic dust (i.e., contaminants) can be suppressed as compared to a case where the base plate 43 is placed on and heated by a hot plate. When applying the induction heating to the base plate 43, an AC current having a frequency within a range of about 5 to 100 kHz may be used instead of about 15 kHz. More preferably, the frequency is set within a range of about 5 to 20 kHz. The induction heating performed at a frequency of 100 kHz or less helps to reduce a thermal deformation in the base plate 43.

While preferred embodiments have been described hereinabove, the present invention is not limited thereto, and may be modified in many different ways. For example, the adhesive agent may be applied on the surface of the thrust yoke 44 to be brought into contact with the base plate 43, although according to the second embodiment shown in FIG. 19 the adhesive agent 71 is applied on the bottom surface 4331 of the recess portion 433 of the base plate 43. Similarly, the adhesive agent may be applied on the inner surface of the stator 42, although according to the first modified example of the second embodiment shown in FIG. 23 the adhesive agent is applied on the stator attachment region 4321 of the base plate 43. In the third modified example of the second embodiment shown in FIG. 29, the adhesive agent may be applied on the outer surface of the upper portion 371 of the shaft 37. In addition, the adhesive agent may be applied on both of two members to be bonded together. The adhesive agent may be applied on one of two constituent parts at the moment of bonding them together.

In the second modified example of the second embodiment shown in FIG. 27, the adhesive agent 71 may be applied on the boundary region between the seal cap 522 and the sleeve 521 after the seal cap 522 has been inserted into the opening of the sleeve 521. The shape of the seal cap is not limited to the disk-like one. It may be possible to use, e.g., a bottom-closed cylindrical seal cap.

In the third embodiment shown in FIG. 32, a resin other than the ultraviolet-curable resin, e.g., a thermally curable resin, may be used as the resin for sealing the bonding portion 81 of the board 8. In this case, the flowability of the thermally curable resin is first increased by preheating the base plate 43. Thereafter, the thermally curable resin is cured by heating the same to an elevated temperature. The method of sealing the bonding portion 81 may be applied to other base parts such as the base bracket 41 and the like.

The method of forming the oil-repellent film on the rotor unit, the stator unit and the motor parts included in the bearing mechanism, the method of bonding two parts together, and the method of sealing the bonding portion of the board may be applied to a motor other than the aforementioned motors 2, 2a and 2b. For example, the method of forming the oil-repellent film on the sleeve housing may be performed on other sleeve housings of different shapes insofar as they are designed to surround at least the outer surface of a porous sleeve. The oil-repellent agent is not limited to the ones used in the first embodiment or the second modified example of the first embodiment.

The method of bonding two parts together may be employed in a motor in which resin-made parts and metallic parts are bonded to each other. This is because the adhesive agent can be cured by induction heating if at least one of two bonded parts is made of metal. The two bonded parts may be other than the motor parts of the embodiments described above.

The metallic parts of the motor on which the oil-repellent film is formed, the parts of the motor to be bonded together, and the base portion to be preheated when sealing the bonding portion 81 of the board 8 are not limited to the metallic materials illustrated in the foregoing embodiments. Other metallic materials may be used insofar as they can be heated by induction heating. As the bearing mechanism of the motor, sliding type bearings or other bearings of different structures may be used in place of the dynamic fluid pressure bearing.

The storage disk drive apparatus that employs the motor is not limited to an apparatus for rotating a magnetic disk but may be an apparatus for driving other storage disks such as an optical disk, a magneto-optical disk and the like. Moreover, the motors described in the foregoing embodiments may be used in the devices other than the storage disk drive apparatus.

While the invention has been shown and described with respect to the preferred embodiments, it will be understood by those skilled in the art that various changes and modifications may be made without departing from the scope of the invention as defined in the following claims.

What is claimed is:

1. A method for forming an oil-repellent film on a metallic part in a dynamic fluid pressure bearing mechanism used for a motor, comprising:
   applying a flowable oil-repellent agent on an application region of the metallic part;
   arranging an induction coil in the vicinity of the metallic part; and
   affixing the oil-repellent agent onto the metallic part by applying an induction heating to the metallic part by supplying an AC current with a frequency of about 5 to 100 kHz to the induction coil.

2. The method of claim 1, wherein the metallic part includes a shaft, and the application region is an annular region on an outer surface of the shaft centered at a central axis.

3. The method of claim 1, wherein the metallic part includes a sleeve, and the application region is an end surface of the sleeve.

4. The method of claim 1, wherein the metallic part includes a sleeve housing that surrounds at least an outer surface of a sleeve that is porous, and the application region is an annular region on the outer surface of the sleeve housing centered at a central axis.

5. The method of claim 1, wherein the metallic part includes a rotor hub having a center portion to which a shaft is attached, and the application region lies beneath a cylinder portion of the rotor hub formed near a central axis.

6. The method of claim 1, wherein the metallic part includes a seal ring that contacts an upper surface of a sleeve, and the application region lies on an upper surface of the seal ring.

7. A motor comprising;
 a dynamic fluid pressure bearing mechanism including a metallic part on which an oil-repellent film is formed by the method of claim 1;
 a stator unit; and
 a rotor unit supported by the dynamic fluid pressure bearing mechanism in a manner rotatable with respect to the stator unit.

8. A method for manufacturing a motor, comprising:
 applying a thermally curable adhesive agent on at least one of a base portion of a stator unit of the motor, and a thrust yoke of the motor for generating with a rotor magnet of a rotor unit of the motor a magnetic attraction force between the thrust yoke and the rotor magnet, and wherein at least one of the base portion and the thrust yoke comprises metal;
 bringing the base portion and the thrust yoke into contact with each other via the adhesive agent;
 arranging an induction coil in the vicinity of the base portion and the thrust yoke disposed in contact with each other through the adhesive agent; and
 applying an induction heating to the induction coil by supplying an AC current with a frequency of about 5 to 100 kHz, thereby indirectly heating the adhesive agent to cure the adhesive agent.

9. A method for manufacturing a motor, comprising:
 applying a thermally curable adhesive agent on at least one of an inner circumferential surface of a stator and an outer circumferential surface of a central cylindrical holder of a base portion of the motor, wherein the stator consists of a core and wiring wound around the core, the base portion also has a flange extending radially outwardly from an end of the cylindrical holder, and the base portion comprises metal;
 inserting the central cylindrical holder into the core of the stator to bring the inner circumferential surface of the stator into contact with the outer circumferential surface of the cylindrical holder via the adhesive agent;
 arranging an induction coil in the vicinity of the stator and base portion whose circumferential surfaces are in contact with each other via the adhesive agent; and
 applying an induction heating to the induction coil by supplying an AC current with a frequency of about 5 to 100 kHz, thereby indirectly heating the adhesive agent to cure the adhesive agent.

10. A method for manufacturing a motor, comprising:
 applying a thermally curable adhesive agent on at least one of a sleeve of the motor or a substantially cylindrical sleeve housing of the motor that covers an outer surface of a sleeve, and a seal cap of the motor, and wherein at least one of the sleeve or sleeve housing and the seal cap comprises metal;
 closing an opening of the sleeve or sleeve housing with the seal cap;
 arranging an induction coil in the vicinity of the sleeve or sleeve housing and the seal cap that closes the opening; and
 after the adhesive agent has been applied, applying an induction heating to the arranged induction coil by supplying an AC current with a frequency of about 5 to 100 kHz, thereby indirectly heating the adhesive agent to cure the adhesive agent.

11. A method for manufacturing a motor, comprising:
 applying a thermally curable adhesive agent on at least one of a shaft of the motor, and a rotor hub of the motor having a central portion, and wherein at least one of the shaft and the rotor hub comprises metal;
 bringing the shaft and the central portion of the rotor hub into contact with each other via the adhesive agent;
 arranging an induction coil in the vicinity of the shaft and the rotor hub in contact with each other via the adhesive agent; and
 applying an induction heating to the induction coil by supplying an AC current with a frequency of about 5 to 100 kHz, thereby indirectly heating the adhesive agent to cure the adhesive agent.

12. A method for manufacturing motor, comprising:
 affixing a lead line, which extends from a stator attached to a metallic base portion of a stator unit, to a board, which is attached to a surface of the base portion facing away from the stator, via a hole formed in the base portion;
 arranging an induction coil in the vicinity of the base portion;
 applying a preliminary induction heating to the base portion by supplying an AC current with a frequency of about 5 to 100 kHz to the induction coil;
 applying a flowable resin material on a bonding portion between the lead line and the board; and
 sealing the bonding portion by curing the resin material.

13. The method of claim 12, wherein the resin material is an ultraviolet-curable resin, and an ultraviolet ray is irradiated on the resin material in said sealing the bonding portion.

* * * * *